US008680218B1

(12) United States Patent
Yang et al.

(10) Patent No.: US 8,680,218 B1
(45) Date of Patent: Mar. 25, 2014

(54) METHODS FOR CONTROLLING DUAL CATALYST OLEFIN POLYMERIZATIONS WITH AN ORGANOZINC COMPOUND

(71) Applicant: Chevron Phillips Chemical Company LP, The Woodlands, TX (US)

(72) Inventors: Qing Yang, Bartlesville, OK (US); Max P. McDaniel, Bartlesville, OK (US); Errun Ding, Bartlesville, OK (US); Ted H. Cymbaluk, Seabrook, TX (US); Tony R. Crain, Niotaze, KS (US); Gary L. Glass, Dewey, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 27 days.

(21) Appl. No.: 13/753,556

(22) Filed: Jan. 30, 2013

(51) Int. Cl.
*C08F 2/38* (2006.01)
*C08F 4/50* (2006.01)
*C08F 4/643* (2006.01)
*C08F 10/02* (2006.01)
*C08F 210/16* (2006.01)

(52) U.S. Cl.
USPC .............. 526/86; 526/60; 526/78; 526/114; 526/119; 526/151; 526/905

(58) Field of Classification Search
USPC .............. 526/60, 78, 86, 114, 119, 151, 905
See application file for complete search history.

(56) References Cited

U.S. PATENT DOCUMENTS

| | | |
|---|---|---|
| 3,242,099 A | 3/1966 | Manyik |
| 3,248,179 A | 4/1966 | Norwood et al. |
| 4,501,885 A | 2/1985 | Sherk et al. |
| 4,588,790 A | 5/1986 | Jenkins, III et al. |
| 4,794,096 A | 12/1988 | Ewen |
| 4,808,561 A | 2/1989 | Welborn, Jr. et al. |
| 5,352,749 A | 10/1994 | DeChellis et al. |
| 5,436,304 A | 7/1995 | Griffin et al. |
| 5,455,314 A | 10/1995 | Burns et al. |
| 5,565,175 A | 10/1996 | Hottovy et al. |
| 5,575,979 A | 11/1996 | Hanson |
| 5,576,259 A | 11/1996 | Hasegawa et al. |
| 5,739,220 A | 4/1998 | Shamshoum et al. |
| 5,807,938 A | 9/1998 | Kaneko et al. |
| 5,919,983 A | 7/1999 | Rosen et al. |
| 6,090,740 A | 7/2000 | Agapiou et al. |
| 6,239,235 B1 | 5/2001 | Hottovy et al. |
| 6,262,191 B1 | 7/2001 | Hottovy et al. |

(Continued)

FOREIGN PATENT DOCUMENTS

| | | |
|---|---|---|
| EP | 0435 250 A2 | 7/1991 |
| EP | 1 092 730 A1 | 4/2001 |

(Continued)

OTHER PUBLICATIONS

Hawley's Condensed Chemical Dictionary, 11$^{th}$ Ed., John Wiley & Sons, 1995, 3 pages.

(Continued)

*Primary Examiner* — Fred M Teskin
(74) *Attorney, Agent, or Firm* — Merchant & Gould

(57) ABSTRACT

Methods for controlling properties of an olefin polymer using an organozinc compound are disclosed. The HLMI/MI shear ratio of the polymer can be decreased and the Mz/Mw ratio of the polymer can be increased via the addition of the organozinc compound.

20 Claims, 1 Drawing Sheet

(56) References Cited

U.S. PATENT DOCUMENTS

| | | | |
|---|---|---|---|
| 6,833,415 B2 | 12/2004 | Kendrick et al. |
| 6,933,353 B2 | 8/2005 | Wang |
| 7,041,617 B2 * | 5/2006 | Jensen et al. ............ 502/113 |
| 7,119,153 B2 | 10/2006 | Jensen et al. |
| 7,196,147 B2 | 3/2007 | Wang et al. |
| 7,226,886 B2 | 6/2007 | Jayaratne et al. |
| 7,294,599 B2 | 11/2007 | Jensen et al. |
| 7,501,372 B2 | 3/2009 | Thorn et al. |
| 7,601,665 B2 | 10/2009 | McDaniel et al. |
| 7,619,047 B2 | 11/2009 | Yang et al. |
| 7,884,163 B2 | 2/2011 | McDaniel et al. |
| 7,915,192 B2 | 3/2011 | Arriola et al. |
| 7,919,639 B2 | 4/2011 | Murray et al. |
| 7,951,882 B2 | 5/2011 | Arriola et al. |
| 8,080,681 B2 | 12/2011 | Murray et al. |
| 8,114,946 B2 | 2/2012 | Yang et al. |
| 8,198,374 B2 | 6/2012 | Arriola et al. |
| 2004/0059070 A1 | 3/2004 | Whitte et al. |
| 2007/0010616 A1 | 1/2007 | Kapur et al. |
| 2008/0311812 A1 | 12/2008 | Arriola et al. |
| 2013/0158216 A1 | 6/2013 | Ding et al. |

FOREIGN PATENT DOCUMENTS

| | | |
|---|---|---|
| GB | 978541 A | 12/1964 |
| GB | 1010075 A | 11/1965 |
| JP | 5093014 A | 4/1993 |
| WO | WO 01/32307 A1 | 5/2001 |
| WO | WO2005/090427 | 9/2005 |

OTHER PUBLICATIONS

Cotton, et al., Advanced Inorganic Chemistry, 6$^{th}$ Ed., Wiley-Interscience, 1999, 4 pages.

International Application PCT/US2012/069661 Search Report dated Apr. 5, 2013, 4 pages.

* cited by examiner

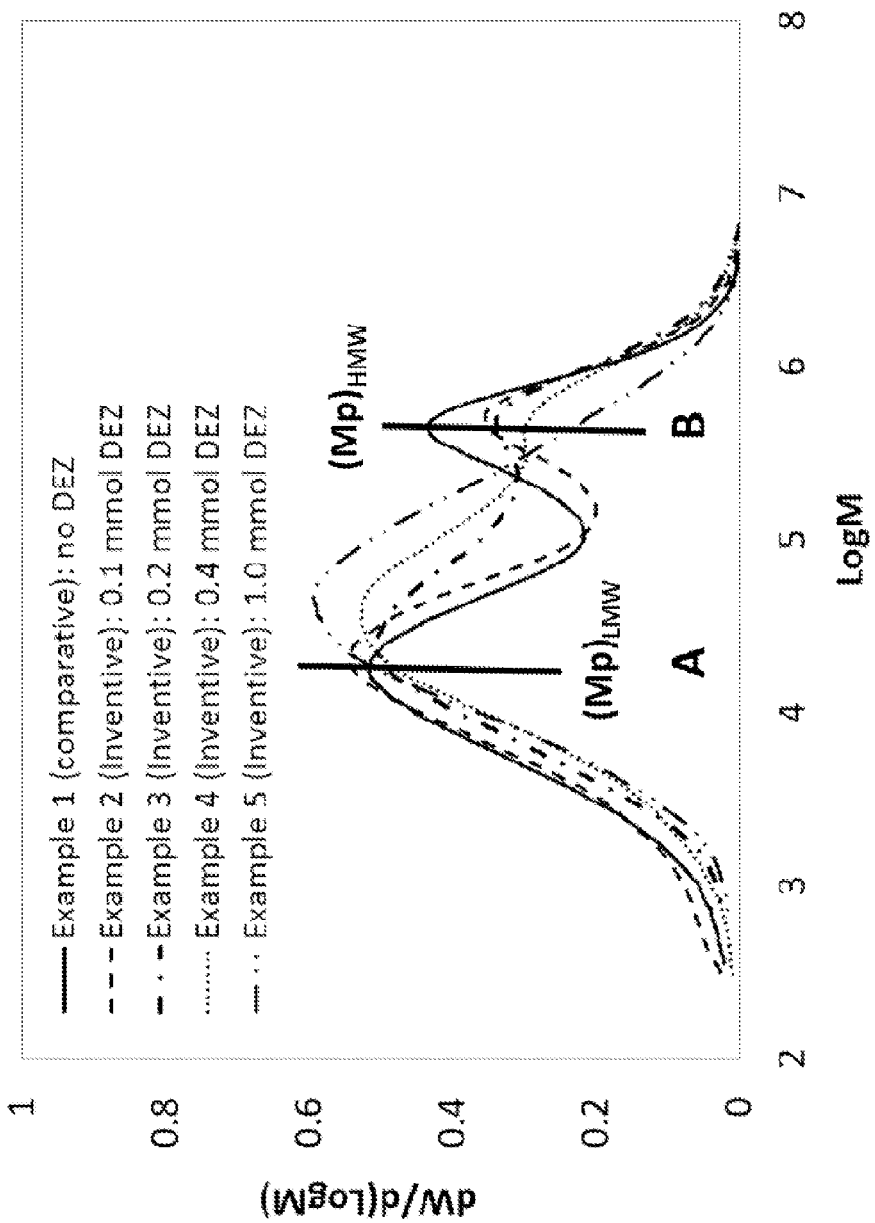

METHODS FOR CONTROLLING DUAL CATALYST OLEFIN POLYMERIZATIONS WITH AN ORGANOZINC COMPOUND

BACKGROUND OF THE INVENTION

There are various methods that can be employed to adjust or control the melt flow properties and the molecular weight characteristics of an olefin-based polymer produced using a dual metallocene catalyst system. For instance, the catalyst composition and/or the polymerization reaction conditions can be changed to vary the melt flow properties and the molecular weight characteristics of the polymer that is produced. However, additional methods of adjusting or controlling the polymer properties are needed which do not require changes in the catalyst composition or the polymerization conditions. Accordingly, it is to this end that the present disclosure is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Various processes and methods related to the control of dual catalyst olefin polymerizations are disclosed herein. In one embodiment, a method of controlling a polymerization reaction in a polymerization reactor system is provided herein, and in this embodiment, the method can comprise:

(i) contacting a dual catalyst system with an olefin monomer and an optional olefin comonomer in the polymerization reactor system under polymerization conditions to produce an olefin polymer,
wherein the dual catalyst system comprises a first metallocene catalyst component and a second metallocene catalyst component, and (ii) introducing an amount of an organozinc compound into the polymerization reactor system to reduce a HLMI/MI shear ratio and/or to increase a Mz/Mw ratio of the olefin polymer.

A process for producing an olefin polymer with a target HLMI/MI shear ratio and/or a target Mz/Mw ratio is provided herein, and in this embodiment, the process can comprise:

(a) contacting a dual catalyst system with an olefin monomer and an optional olefin comonomer in a polymerization reactor system under polymerization conditions,
wherein the dual catalyst system comprises a first metallocene catalyst component and a second metallocene catalyst component, and (b) controlling an amount of an organozinc compound introduced into the polymerization reactor system to produce the olefin polymer with the target HLMI/MI shear ratio and/or the target Mz/Mw ratio.

In these methods and processes, the HLMI/MI shear ratio of the olefin polymer can decrease and/or the Mz/Mw ratio of the olefin polymer can increase as the amount of the organozinc compound added to the polymerization reactor system is increased.

Both the foregoing summary and the following detailed description provide examples and are explanatory only. Accordingly, the foregoing summary and the following detailed description should not be considered to be restrictive. Further, features or variations may be provided in addition to those set forth herein. For example, certain embodiments may be directed to various feature combinations and sub-combinations described in the detailed description.

BRIEF DESCRIPTION OF THE FIGURES

FIGURE

The FIGURE presents a plot of the molecular weight distribution as a function of the amount of diethylzinc (DEZ) for Examples 1-5.

DEFINITIONS

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Regarding claim transitional terms or phrases, the transitional term "comprising," which is synonymous with "including," "containing," "having," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claim. A "consisting essentially of" claim occupies a middle ground between closed claims that are written in a "consisting of" format and fully open claims that are drafted in a "comprising" format. For example, a composition consisting essentially of a material A can include impurities typically present in a commercially produced or commercially available sample of the recited material A. When a claim includes different features and/or feature classes (for example, a method step, composition features, and/or product features, among other possibilities), the transitional terms comprising, consisting essentially of, and consisting of, apply only to the feature class to which it is utilized, and it is possible to have different transitional terms or phrases utilized with different features within a claim. For example, a method can comprise several recited steps (and other non-recited steps), but utilize a catalyst system preparation consisting of specific components; alternatively, consisting essentially of specific components; or alternatively, comprising the specific components and other non-recited components.

While compositions and methods are often described in terms of "comprising" various components or steps, the compositions and methods can also "consist essentially of" or "consist of" the various components or steps, unless stated otherwise.

The terms "a," "an," and "the" are intended to include plural alternatives, e.g., at least one. For instance, the disclosure of "an activator," "an olefin comonomer," etc., is meant to encompass one, or mixtures or combinations of more than one, activator, olefin comonomer, etc., unless otherwise specified.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. A general reference to pentane, for example, includes n-pentane, 2-methylbutane, and 2,2-dimethylpropane; and a general reference to a butyl group includes a n-butyl group, a sec-butyl group, an iso-butyl group, and a t-butyl group.

Also, unless otherwise specified, any carbon-containing group or compound for which the number of carbon atoms is not specified can have 1, 2, 3, 4, 5, 6, 7, 8, 9, 10, 11, 12, 13, 14, 15, 16, 17, 18, 19, or 20 carbon atoms, or any range or combination of ranges between these values. For example, unless otherwise specified, any carbon-containing group or compound can have from 1 to 20 carbon atoms, from 1 to 18 carbon atoms, from 1 to 12 carbon atoms, from 1 to 8 carbon atoms, from 2 to 20 carbon atoms, from 2 to 12 carbon atoms, from 2 to 8 carbon atoms, or from 2 to 6 carbon atoms, and the like. Moreover, other identifiers or qualifying terms can be utilized to indicate the presence of, or absence of, a particular substituent, a particular regiochemistry, and/or stereochemistry, or the presence of absence of a branched underlying structure or backbone. Any specific carbon-containing group is limited according to the chemical and structural requirements for that specific group, as understood by one of ordinary skill.

Other numerical ranges are disclosed herein. When Applicants disclose or claim a range of any type, Applicants' intent is to disclose or claim individually each possible number that such a range could reasonably encompass, including end points of the range as well as any sub-ranges and combinations of sub-ranges encompassed therein, unless otherwise specified. As a representative example, Applicants disclose that a weight ratio of the higher molecular weight component to the lower molecular weight component can be in a range from about 1:10 to about 10:1 in certain embodiments. By a disclosure that the weight ratio of the higher molecular weight component to the lower molecular weight component can be in a range from about 1:10 to about 10:1, Applicants intend to recite that the weight ratio can be equal to about 1:10, about 1:9, about 1:8, about 1:7, about 1:6, about 1:5, about 1:4, about 1:3, about 1:2, about 1:1, about 2:1, about 3:1, about 4:1, about 5:1, about 6:1, about 7:1, about 8:1, about 9:1, or about 10:1. Additionally, the weight ratio can be within any range from about 1:10 to about 10:1 (for example, the weight ratio can be in a range from about 1:2 to about 2:1), and this also includes any combination of ranges between about 1:10 and 10:1. Likewise, all other ranges disclosed herein should be interpreted in a manner similar to these examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

The term "substituted" when used to describe a group or a chain of carbon atoms, for example, when referring to a substituted analog of a particular group or chain, is intended to describe or group or chain wherein any non-hydrogen moiety formally replaces a hydrogen in that group or chain, and is intended to be non-limiting. A group or chain also can be referred to herein as "unsubstituted" or by equivalent terms such as "non-substituted," which refers to the original group or chain. "Substituted" is intended to be non-limiting and can include hydrocarbon substituents as specified and as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, among other groups as members.

The term "polymer" is used herein generically to include olefin homopolymers, copolymers, terpolymers, and so forth. A copolymer can be derived from an olefin monomer and one olefin comonomer, while a terpolymer can be derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer could be categorized an as ethylene/1-hexene copolymer. The term "polymer" also is meant to include all molecular weight polymers, and is inclusive of lower molecular weight polymers or oligomers. Applicants intend for the term "polymer" to encompass oligomers derived from any olefin monomer disclosed herein (as well from an olefin monomer and one olefin comonomer, an olefin monomer and two olefin comonomers, and so forth).

In like manner, the scope of the term "polymerization" includes homopolymerization, copolymerization, terpolymerization, etc., as well as processes that might also be referred to as oligomerization processes. Therefore, a copolymerization process would involve contacting an olefin monomer (e.g., ethylene) and an olefin comonomer (e.g., 1-hexene) to produce an olefin copolymer.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst, the metallocene compound(s), any olefin monomer used to prepare a precontacted mixture, or the activator (e.g., activator-support), after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, may be used interchangeably throughout this disclosure.

The terms "contact product," "contacting," and the like, are used herein to describe compositions wherein the components are contacted together in any order, in any manner, and for any length of time. For example, the components can be contacted by blending or mixing. Further, unless otherwise specified, the contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can, and often does, include reaction products, it is not required for the respective components to react with one another. Likewise, "contacting" two or more components can result in a reaction product or a reaction mixture. Consequently, depending upon the circumstances, a "contact product" can be a mixture, a reaction mixture, or a reaction product.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

DETAILED DESCRIPTION OF THE INVENTION

Disclosed herein are methods and processes directed to controlling dual catalyst olefin polymerizations in a polymerization reactor system via the addition of an organozinc compound. In these methods and processes, the amount of the organozinc added to the reactor system can be used to increase or decrease the HLMI/MI shear ratio of the olefin polymer, and additionally or alternatively, can be used to increase or decrease the Mz/Mw ratio of the olefin polymer. The polymerization reaction can be conducted in a reactor system which can contain one reactor, or alternatively, two or more reactors in series or parallel.

For example, in one embodiment, a method of controlling a polymerization reaction in a polymerization reactor system is disclosed. In this embodiment, the method can comprise:

(i) contacting a dual catalyst system with an olefin monomer and an optional olefin comonomer in the polymerization reactor system under polymerization conditions to produce an olefin polymer, wherein the dual catalyst system comprises a first metallocene catalyst component and a second metallocene catalyst component, and (ii) introducing an amount of an organozinc compound into the polymerization reactor system to reduce a HLMI/MI shear ratio and/or to increase a Mz/Mw ratio of the olefin polymer.

Thus, the addition of the organozinc compound (e.g., increasing the amount of the organozinc compound) can decrease the HLMI/MI shear ratio of the olefin polymer. Alternatively, the addition of the organozinc compound (e.g., increasing the amount of the organozinc compound) can increase the Mz/Mw ratio of the olefin polymer, or alternatively, the addition of the organozinc compound (e.g., increasing the amount of the organozinc compound) can decrease the HLMI/MI shear ratio and increase the Mz/Mw ratio of the olefin polymer.

In another embodiment, a process for producing an olefin polymer with a target HLMI/MI shear ratio and/or a target Mz/Mw ratio is disclosed. In this embodiment, the process can comprise:

(a) contacting a dual catalyst system with an olefin monomer and an optional olefin comonomer in a polymerization reactor system under polymerization conditions, wherein the dual catalyst system comprises a first metallocene catalyst component and a second metallocene catalyst component, and (b) controlling an amount of an organozinc compound introduced into the polymerization reactor system to produce the olefin polymer with the target HLMI/MI shear ratio and/or the target Mz/Mw ratio.

Thus, the addition of the organozinc compound (e.g., increasing the amount of the organozinc compound) can be used to produce an olefin polymer with a target HLMI/MI shear ratio, or a target Mz/Mw ratio, or both. MI is an abbreviation for the melt index (g/10 min), HLMI is an abbreviation for the high load melt index (g/10 min), Mw is an abbreviation for the weight-average molecular weight (g/mol), and Mz is an abbreviation for the z-average molecular weight (g/mol).

In these methods and processes, the organozinc compound can be introduced (e.g., added, injected, etc.) into the polymerization reactor system by any suitable means, for instance, alone, or with a carrier (e.g., a carrier gas, a carrier liquid, etc.). The organozinc compound can be introduced into the polymerization reactor system at any suitable location within the reactor system. In one embodiment, the organozinc compound can be added directly into a polymerization reactor within the polymerization reactor system, while in another embodiment, the organozinc compound can be introduced into the polymerization reaction system at a feed or inlet location other than directly into a polymerization reactor, for example, in a recycle stream. In some embodiments, the organozinc compound can be added to the reactor by itself, while in other embodiments, the organozinc compound can be added to the reactor with a carrier or solvent, non-limiting examples of which can include, but are not limited to isobutane, n-butane, n-pentane, isopentane, neopentane, n-hexane, heptane, octane, cyclohexane, cycloheptane, methylcyclohexane, methylcycloheptane, benzene, toluene, xylene, ethylbenzene, and the like, or combinations thereof. In particular embodiments contemplated herein, the organozinc compound can be added to the polymerization reactor system with the dual catalyst system.

Generally, the features of the methods and processes disclosed herein (e.g., the dual catalyst system, the first metallocene catalyst component, the second metallocene component, the olefin monomer, the olefin comonomer, the polymerization conditions, the polymerization reactor system, the organozinc compound, the amount of the organozinc compound, the HLMI/MI shear ratio, the Mz/Mw ratio, among others) are independently described herein, and these features can be combined in any combination to further describe the disclosed processes and methods.

In certain methods and processes disclosed herein, a dual catalyst system can be contacted with an olefin monomer and optionally an olefin comonomer in the polymerization reactor system, and an organozinc compound can be added to the reactor system. As would be recognized by one of skill in the art, additional components can be introduced into the polymerization reactor system in addition to these recited components, and such unrecited components are encompassed herein. For instance, in the operation of a polymerization reactor system—depending, of course, on the polymerization reactor type, the desired olefin polymer, etc., among other factors—solvents and/or diluents and/or fluidizing gases, recycle streams, etc., also can be added or introduced into the polymerization reactor and polymerization reactor system.

The weight ratio of the first metallocene catalyst component to the second metallocene catalyst component in the dual catalyst system generally is not limited to any particular range of weight ratios. Nonetheless, in some embodiments, the weight ratio of the first metallocene catalyst component to the second metallocene catalyst component can be in a range of from about 1:100 to about 100:1, from about 1:50 to about 50:1, from about 1:25 to about 25:1, from about 1:10 to about 10:1, or from about 1:5 to about 5:1. Accordingly, suitable ranges for the weight ratio of the first metallocene catalyst component to the second metallocene catalyst component can include, but are not limited to, from about 1:15 to about 15:1, from about 1:10 to about 10:1, from about 1:8 to about 8:1, from about 1:5 to about 5:1, from about 1:4 to about 4:1, from about 1:3 to about 3:1, from about 1:2 to about 2:1, from about 1:1.8 to about 1.8:1, from about 1:1.5 to about 1.5:1, from about 1:1.3 to about 1.3:1, from about 1:1.25 to about 1.25:1, from about 1:1.2 to about 1.2:1, from about 1:1.15 to about 1.15:1, from about 1:1.1 to about 1.1:1, or from about 1:1.05 to about 1.05:1, and the like.

Consistent with embodiments disclosed herein, the weight ratio of the first metallocene catalyst component to the second metallocene catalyst component can be held substantially constant (e.g., within +/−5%), for example, for the production of a particular polymer grade. In such circumstances, the addition of the organozinc compound can be used to control, adjust, fine-tune, etc., the production and properties of that particular polymer grade, without having to vary the catalyst composition.

Optionally, if additional control parameters for the dual catalyst polymerization process are desired other than the use of an organozinc compound, the methods and processes disclosed herein can further comprise a step of adjusting the weight ratio of the first metallocene catalyst component to the second metallocene catalyst component.

In some embodiments, the polymerization conditions can be held substantially constant (e.g., within +/−5%.), for example, for the production of a particular polymer grade. Representative polymerization conditions include temperature, pressure, residence time, % solids, and the like. As above, in such circumstances, the addition of the organozinc compound can be used to control, adjust, fine-tune, etc., the production and properties of that particular polymer grade.

Optionally, if additional control parameters for the dual catalyst polymerization process are desired other than the use of an organozinc compounds, the methods and processes disclosed herein can further comprise a step of adjusting at least one polymerization condition (e.g., temperature, pressure, residence time, etc.).

Unexpectedly, in these methods and processes, the HLMI/MI shear ratio of the olefin polymer can decrease as the amount of the organozinc compound added to the polymerization reactor system is increased. Also unexpectedly, the Mz/Mw ratio of the olefin polymer can increase as the amount of the organozinc compound added to the polymerization reactor system is increased. The organozinc compound can be added to the polymerization reactor system (e.g., into a polymerization reactor) alone, with a carrier, with the dual catalyst system, etc. The amount of the organozinc compound added to the reactor system is not particularly limited, so long as the amount of the organozinc compound added to the reactor system is sufficient to impact the HLMI/MI shear ratio and/or the Mz/Mw ratio of the olefin polymer as described herein. Nonetheless, while not being limited thereto, the amount of the organozinc compound added typically can be in a range of moles of the organozinc compound to the total moles of the first metallocene catalyst component and the second metallocene catalyst component from about 5:1 to about 250:1. This molar ratio is based on the respective amounts of the organozinc compound, the first metallocene catalyst component, and the second metallocene catalyst component fed into the reactor system (e.g., into a polymerization reactor). As a non-limiting example of a 50:1 molar ratio, in a continuous polymerization reactor system, the total amount of the first and second metallocene catalyst components fed into the reactor(s) per time interval can be "Y" moles/hour; thus, the amount of the organozinc compound fed into the reactor(s) would be equal to "50Y" moles/hour for a 50:1 molar ratio.

In some embodiments, this molar ratio (moles of organozinc compound to total moles of metallocene components) can be in a range from about 5:1 to about 200:1, from about 10:1 to about 250:1, from about 10:1 to about 200:1, from about 20:1 to about 200:1, from about 10:1 to about 180:1, from about 15:1 to about 180:1, from about 10:1 to about 150:1, from about 15:1 to about 150:1, or from about 10:1 to about 125:1. In particular embodiments considered herein, the molar ratio can be in a range from about 25:1 to about 120:1, from about to about 30:1 to about 120:1, from about 40:1 to about 120:1, from about 30:1 to about 100:1, from about 30:1 to about 90:1, or from about 40:1 to about 80:1.

In an embodiment, the organozinc compound can be added into the polymerization reactor system continuously. For instance, the organozinc compound can be added to the reactor whenever the olefin monomer or the metallocene catalyst components, or both, are added to the reactor. Alternatively, the organozinc compound can be added periodically, on an as-needed basis, or pulsed to the reactor. Intermittent addition to a polymerization reactor is disclosed, for instance, in U.S. Pat. No. 5,739,220 and U.S. Patent Publication No. 2004/0059070, the disclosures of which are incorporated herein by reference in their entirety.

The addition of the organozinc compound can be used to produce olefin polymers having various melt flow rate and molecular weight properties. For example, the melt index (MI) of the olefin polymer (e.g., an ethylene/α-olefin copolymer) can be less than about 50, less than about 25, less than about 10, or less than about 5 g/10 min. Contemplated ranges for the MI of olefin polymers produced by the methods and processes disclosed herein can include, but are not limited to, from 0 to about 25 g/10 min, from 0 to about 5 g/10 min, from about 0.005 to about 5 g/10 min, from about 0.005 to about 2 g/10 min, from about 0.005 to about 1 g/10 min, from about 0.01 to about 5 g/10 min, from about 0.01 to about 2 g/10 min, from about 0.01 to about 1 g/10 min, from about 0.05 to about 5 g/10 min, from about 0.05 to about 2 g/10 min, from about 0.05 to about 1 g/10 min, from about 0.05 to about 0.5 g/10 min, from about 0.1 to about 2 g/10 min, from about 0.1 to about 1 g/10 min, or from about 0.1 to about 0.8 g/10 min.

In some embodiments, the weight-average molecular weight (Mw) of the olefin polymer produced by the methods and processes disclosed herein can be in a range from about 50,000 to about 500,000 g/mol, from about 75,000 to about 400,000 g/mol, or from about 100,000 to about 350,000 g/mol. In other embodiments, the Mw can be in range from about 100,000 to about 300,000 g/mol, from about 100,000 to about 275,000 g/mol, from about 100,000 to about 250,000 g/mol, from 125,000 to about 300,000 g/mol, from about 125,000 to about 250,000 g/mol, or from about 150,000 to about 250,000 g/mol. Suitable ranges for the number-average molecular weight (Mn) of the olefin polymer can include, but are not limited to, from about 5,000 to about 50,000 g/mol, from about 5,000 to about 40,000 g/mol, from about 5,000 to about 30,000 g/mol, from about 5,000 to about 25,000 g/mol, from about 5,000 to about 20,000 g/mol, from about 6,000 to about 30,000 g/mol, from about 6,000 to about 25,000 g/mol, from about 6,000 to about 20,000 g/mol, or from about 7,000 to about 18,000 g/mol.

In some embodiments, the Mw/Mn ratio of the olefin polymer produced by the methods and processes disclosed herein can be in a range from about 4 to about 50, from about 5 to about 40, from about 5 to about 35, from about 5 to about 30, from about 6 to about 40, from about 6 to about 35, from about 6 to about 30, from about 6 to about 25, from about 7 to about 40, from about 7 to about 35, from about 7 to about 30, from about 7 to about 28, from about 8 to about 30, from about 8 to about 28, from about 10 to about 40, or from about 10 to about 30.

In one embodiment, no hydrogen is added to the polymerization reactor system. As one of ordinary skill in the art would recognize, hydrogen can be generated in-situ by the first and/or second metallocene catalyst component during the dual catalyst olefin polymerization process. In this embodiment, there is no "added hydrogen" to the reactor system.

Although not required, however, hydrogen can be added to the polymerization reactor system in certain embodiments. Optionally, for instance, the methods and processes provided herein can further comprise a step of adding hydrogen to the polymerization reactor system to adjust a molecular weight parameter (e.g., Mw, Mn, Mw/Mn, etc.) of the olefin polymer, and/or to adjust the MI of the olefin polymer, if desired. Generally, the step of adding hydrogen can decrease the Mw (and/or Mn), and/or increase the MI of the polymer.

In embodiments where hydrogen is added to the polymerization reactor system, the hydrogen addition can be held substantially constant (e.g., within +/−20%), for example, for the production of a particular polymer grade. For example, the ratio of hydrogen to the olefin monomer in the polymerization process can be controlled, often by the feed ratio of hydrogen to the olefin monomer entering the reactor. Further, the addition of comonomer (or comonomers) can be, and generally is, substantially constant throughout the polymerization run for a particular copolymer grade. However, in other embodiments, it is contemplated that monomer, comonomer (or comonomers), and/or hydrogen can be periodically pulsed to the reactor, for instance, in a manner similar to that employed in U.S. Pat. No. 5,739,220 and U.S. Patent Publication No. 2004/0059070, the disclosures of which are incorporated herein by reference in their entirety.

The olefin polymer produced using the dual catalyst system can contain a higher molecular weight component and a lower molecular weight component in certain embodiments disclosed herein. The weight ratio of the higher molecular weight component to the lower molecular weight component generally is not limited to any particular range of weight ratios. Nonetheless, in some embodiments, the weight ratio of the higher molecular weight component to the lower molecular weight component can be in a range of from about 1:100 to about 100:1, from about 1:50 to about 50:1, from about 1:25 to about 25:1, from about 1:10 to about 10:1, or from about 1:5 to about 5:1. Accordingly, suitable ranges for the weight ratio of the higher molecular weight component to the lower molecular weight component can include, but are not limited to, from about 1:15 to about 15:1, from about 1:10 to about 10:1, from about 1:8 to about 8:1, from about 1:5 to about 5:1, from about 1:4 to about 4:1, from about 1:3 to about 3:1, from about 1:2 to about 2:1, from about 1:1.8 to about 1.8:1, from about 1:1.5 to about 1.5:1, from about 1:1.3 to about 1.3:1, from about 1:1.25 to about 1.25:1, from about 1:1.2 to about 1.2:1, from about 1:1.15 to about 1.15:1, from about 1:1.1 to about 1.1:1, or from about 1:1.05 to about 1.05:1, and the like.

In the disclosed methods and processes, the HLMI/MI shear ratio of the olefin polymer can decrease and/or the Mz/Mw ratio of the olefin polymer can increase as the amount of the organozinc compound added to the polymerization reactor system is increased. For olefin polymers having a higher molecular weight component and a lower molecular weight component, unexpectedly, the introduction of the organozinc compound into the polymerization reactor system can reduce the weight ratio of the higher molecular weight component to the lower molecular weight component.

Moreover, the addition of the organozinc compound into the polymerization reactor system can increase the peak molecular weight (Mp) of the lower molecular weight component of the olefin polymer. However, in certain embodiments, the addition of the organozinc compound into the polymerization reactor system can have substantially no effect on the peak molecular weight (Mp) of the higher molecular weight component of the olefin polymer. In this regard, "substantially" no effect (substantially no change in Mp) means that the peak molecular weight after addition of the organozinc compound is within +/−15% of the peak molecular weight prior to addition of the organozinc compound. In some embodiments, the peak molecular weights can be within +/−10% or, alternatively, +/−5%.

For the production of a particular grade of an olefin polymer, with certain desired polymer properties, a target HLMI/MI shear ratio of the olefin polymer can be established. Thus, when the particular polymer grade is produced, variables can be adjusted in order to achieve the targeted HLMI/MI shear ratio. Accordingly, in some embodiments, the processes and methods provided herein optionally can further comprise the steps of determining (or measuring) the HLMI/MI shear ratio of the olefin polymer, and then adjusting the amount of the organozinc compound introduced into the polymerization reactor system based on the difference between the measured HLMI/MI shear ratio and the target HLMI/MI shear ratio. As a representative example, if the measured HLMI/MI shear ratio is higher than that of the target HLMI/MI shear ratio for the production of a particular grade of olefin polymer, then the organozinc compound can be added at an amount appropriate to make the measured HLMI/MI shear ratio equivalent to that of the target HLMI/MI shear ratio. For instance, the feed rate of the organozinc compound can be increased to reduce the HLMI/MI shear ratio of the olefin polymer.

Likewise, for the production of a particular grade of an olefin polymer, with certain desired polymer properties, a target Mz/Mw ratio of the olefin polymer can be established. Thus, when the particular polymer grade is produced, variables can be adjusted in order to achieve the targeted Mz/Mw ratio. Accordingly, in some embodiments, the processes and methods provided herein optionally can further comprise the steps of determining (or measuring) the Mz/Mw ratio of the olefin polymer, and then adjusting the amount of the organozinc compound introduced into the polymerization reactor system based on the difference between the measured Mz/Mw ratio and the target Mz/Mw ratio. As a representative example, if the measured Mz/Mw ratio is less than that of the target Mz/Mw ratio for the production of a particular grade of olefin polymer, then the organozinc compound can be added at an amount appropriate to make the measured Mz/Mw ratio equivalent to that of the target Mz/Mw ratio. For instance, the feed rate of the organozinc compound can be increased to increase the Mz/Mw ratio of the olefin polymer.

Consistent with embodiments disclosed herein, optionally and as-needed, various polymerization conditions or process variables can be adjusted and/or controlled during the operation of a polymerization reactor system, and such conditions or variables can include, but are not limited to, reaction temperature, reactor pressure, residence time, catalyst system flow rate into the reactor, monomer flow rate (and comonomer, if employed) into the reactor, olefin polymer output rate, recycle rate, hydrogen flow rate (if employed), reactor cooling status, slurry density, circulation pump power, and the like.

In each of the methods and process disclosed herein, the HLMI/MI shear ratio of the olefin polymer can decrease and/or the Mz/Mw ratio of the olefin polymer can increase as the amount of the organozinc compound added to the polymerization reactor system increases.

Organozinc Compounds

Organozinc compounds suitable for use herein can include, but are not limited to, compounds having the formula:

$$Zn(X^{10})(X^{11}) \qquad (I).$$

Generally, the selections of $X^{10}$ and $X^{11}$ in formula (I) are independently described herein, and these selections can be combined in any combination to further describe the organozinc compound having formula (I). In some embodiments, $X^{10}$ can be a $C_1$ to $C_{18}$ hydrocarbyl group, and $X^{11}$ can be H, a halide, or a $C_1$ to $C_{18}$ hydrocarbyl or $C_1$ to $C_{18}$ hydrocarboxy group. It is contemplated in these and other embodiments that $X^{10}$ and $X^{11}$ can be the same, or that $X^{10}$ and $X^{11}$ can be different.

In one embodiment, $X^{10}$ and $X^{11}$ independently can be a $C_1$ to $C_{18}$ hydrocarbyl group, while in another embodiment, $X^{10}$ and $X^{11}$ independently can be a $C_1$ to $C_{12}$ hydrocarbyl group. In yet another embodiment, $X^{10}$ and $X^{11}$ independently can be a $C_1$ to $C_8$ hydrocarbyl group or a $C_1$ to $C_5$ hydrocarbyl group. In still another embodiment, $X^{10}$ and $X^{11}$ independently can be a $C_1$ to $C_{18}$ alkyl group, a $C_2$ to $C_{18}$ alkenyl group, a $C_6$ to $C_{18}$ aryl group, or a $C_7$ to $C_{18}$ aralkyl group. In these and other embodiments, $X^{10}$ and $X^{11}$ independently can be a $C_1$ to $C_{12}$ alkyl group, a $C_2$ to $C_{12}$ alkenyl group, a $C_6$ to $C_{15}$ aryl group, or a $C_7$ to $C_{15}$ aralkyl group; alternatively, $X^{10}$ and $X^{11}$ independently can be a $C_1$ to $C_{10}$ alkyl group, a $C_2$ to $C_{10}$ alkenyl group, a $C_6$ to $C_{12}$ aryl group, or a $C_7$ to $C_{12}$ aralkyl group; alternatively, $X^{10}$ and $X^{11}$ independently can be a $C_1$ to $C_8$ alkyl group, a $C_2$ to $C_8$ alkenyl group, a $C_6$ to $C_{10}$ aryl group, or a $C_7$ to $C_{10}$ aralkyl group; or alternatively, $X^{10}$ and $X^{11}$ independently can be a $C_1$ to $C_5$ alkyl group, a $C_2$ to $C_5$ alkenyl group, a $C_6$ to $C_8$ aryl group, or a $C_7$ to $C_8$ aralkyl group.

Accordingly, in some embodiments, the alkyl group which can be $X^{10}$ and/or $X^{11}$ in formula (I) can be a methyl group, an ethyl group, a propyl group, a butyl group, a pentyl group, a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, or an octadecyl group; or alternatively, a methyl group, an ethyl group, a propyl group, a butyl group, a pentyl group, a hexyl group, a heptyl group, an octyl group, a nonyl group, or a decyl group. In other embodiments, the alkyl group which can be $X^{10}$ and/or $X^{11}$ in formula (I) can be a methyl group, an ethyl group, a n-propyl group, an iso-propyl group, a n-butyl group, an iso-butyl group, a sec-butyl group, a tert-butyl group, a n-pentyl group, an iso-pentyl group, a sec-pentyl group, or a neopentyl group; alternatively, a methyl group, an ethyl group, an iso-propyl group, a n-butyl group, a tert-butyl group, or a neopentyl group; alternatively, a methyl group; alternatively, an ethyl group; alternatively, a n-propyl group; alternatively, an iso-propyl group; alternatively, a n-butyl group; alternatively, a tert-butyl group; or alternatively, a neopentyl group.

Illustrative alkenyl groups which can be $X^{10}$ and/or $X^{11}$ in formula (I) can include, but are not limited to, an ethenyl group, a propenyl group, a butenyl group, a pentenyl group, a hexenyl group, a heptenyl group, an octenyl group, a nonenyl group, a decenyl group, a undecenyl group, a dodecenyl group, a tridecenyl group, a tetradecenyl group, a pentadecenyl group, a hexadecenyl group, a heptadecenyl group, or an octadecenyl group. In one embodiment, $X^{10}$ and/or $X^{11}$ in formula (I) can be an ethenyl group, a propenyl group, a butenyl group, a pentenyl group, a hexenyl group, a heptenyl group, an octenyl group, a nonenyl group, or a decenyl group, while in another embodiment, $X^{10}$ and/or $X^{11}$ can be an ethenyl group, a propenyl group, a butenyl group, a pentenyl group, or a hexenyl group. For example, $X^{10}$ and/or $X^{11}$ can be an ethenyl group; alternatively, a propenyl group; alternatively, a butenyl group; alternatively, a pentenyl group; or alternatively, a hexenyl group. In yet another embodiment, $X^{10}$ and/or $X^{11}$ can be an acyclic terminal alkenyl group, such as a $C_3$ to $C_{10}$, or a $C_3$ to $C_8$, terminal alkenyl group.

In some embodiments, the aryl group which can be $X^{10}$ and/or $X^{11}$ in formula (I) can be a phenyl group, a substituted phenyl group, a naphthyl group, or a substituted naphthyl group. In an embodiment, the aryl group can be a phenyl group or a substituted phenyl group; alternatively, a naphthyl group or a substituted naphthyl group; alternatively, a phenyl group or a naphthyl group; or alternatively, a substituted phenyl group or a substituted naphthyl group. Substituents which can be utilized for the substituted phenyl group or substituted naphthyl group are independently disclosed herein and can be utilized without limitation to further describe the substituted phenyl group or substituted naphthyl group which can be $X^{10}$ and/or $X^{11}$ in formula (I). In an embodiment, the substituted phenyl group which can be $X^{10}$ and/or $X^{11}$ can be a 2-substituted phenyl group, a 3-substituted phenyl group, a 4-substituted phenyl group, a 2,4-disubstituted phenyl group, a 2,6-disubstituted phenyl group, 3,5-disubstituted phenyl group, or a 2,4,6-trisubstituted phenyl group. In other embodiments, the substituted phenyl group can be a 2-substituted phenyl group, a 4-substituted phenyl group, a 2,4-disubstituted phenyl group, or a 2,6-disubstituted phenyl group; alternatively, a 3-substituted phenyl group or a 3,5-disubstituted phenyl group; alternatively, a 2-substituted phenyl group or a 4-substituted phenyl group; alternatively, a 2,4-disubstituted phenyl group or a 2,6-disubstituted phenyl group; alternatively, a 2-substituted phenyl group; alternatively, a 3-substituted phenyl group; alternatively, a 4-substituted phenyl group; alternatively, a 2,4-disubstituted phenyl group; alternatively, a 2,6-disubstituted phenyl group; alternatively, 3,5-disubstituted phenyl group; or alternatively, a 2,4,6-trisubstituted phenyl group. Substituents which can be utilized for these specific substituted phenyl groups are independently disclosed herein and can be utilized without limitation to further describe these substituted phenyl groups which can be the $X^{10}$ and/or $X^{11}$ group of formula (I).

In some embodiments, the aralkyl group which can be utilized as $X^{10}$ and/or $X^{11}$ of formula (I) can be a benzyl group or a substituted aralkyl group, such as a substituted benzyl group. Substituents which can be utilized for the substituted aralkyl group are independently disclosed herein and can be utilized without limitation to further describe the substituted aralkyl group which can be $X^{10}$ and/or $X^{11}$ of formula (I).

In an embodiment, each non-hydrogen substituent for the substituted aryl group or substituted aralkyl group which can be $X^{10}$ and/or $X^{11}$ in formula (I) independently can be a $C_1$ to $C_{10}$ hydrocarbyl group; alternatively, a $C_1$ to $C_8$ hydrocarbyl group; or alternatively, a $C_1$ to $C_5$ hydrocarbyl group. Specific substituent hydrocarbyl groups are independently disclosed herein and can be utilized without limitation to further describe the substituents of the substituted aryl group or substituted aralkyl group which can be $X^{10}$ and/or $X^{11}$ of formula (I). The number of substituents and their respective number of carbon atoms in any substituted aryl group or substituted aralkyl group is limited such that $X^{10}$ and $X^{11}$ of formula (I) have at most 24 carbon atoms. Exemplary hydrocarbyl substituents can include, but are not limited to, an alkyl group, such as a methyl group, an ethyl group, a n-propyl group, an isopropyl group, a n-butyl group, a sec-butyl group, an isobutyl group, a tert-butyl group, a n-pentyl group, a 2-pentyl group, a 3-pentyl group, a 2-methyl-1-butyl group, a tert-pentyl group, a 3-methyl-1-butyl group, a 3-methyl-2-butyl group, or a neo-pentyl group, and the like, including combinations thereof.

In one embodiment, $X^{10}$ and $X^{11}$ independently can be a $C_1$ to $C_{12}$ alkyl group, a $C_2$ to $C_{12}$ alkenyl group, a $C_6$ to $C_{15}$ aryl group, or a $C_7$ to $C_{15}$ aralkyl group; or alternatively, a $C_1$ to $C_8$ alkyl group, a $C_2$ to $C_8$ alkenyl group, a $C_6$ to $C_{10}$ aryl group, or a $C_7$ to $C_{10}$ aralkyl group. In another embodiment, $X^{10}$ and $X^{11}$ independently can be a $C_1$ to $C_{12}$ alkyl group or a $C_2$ to $C_{12}$ alkenyl group. In yet another embodiment, $X^{10}$ and $X^{11}$ independently can be methyl, ethyl, propyl, butyl, pentyl (e.g., neopentyl), hexyl, heptyl, octyl, nonyl, decyl, ethenyl, propenyl, butenyl, pentenyl, hexenyl, heptenyl, octenyl, nonenyl, decenyl, phenyl, benzyl, or tolyl; alternatively, methyl, ethyl, propyl, butyl, pentyl, hexyl, heptyl, octyl, ethenyl, propenyl, butenyl, pentenyl, hexenyl, heptenyl, octenyl, phenyl, benzyl, or tolyl; alternatively, methyl, ethyl, propyl, butyl, pentyl, hexyl, ethenyl, propenyl, butenyl, pentenyl, hexenyl, phenyl, benzyl, or tolyl; or alternatively, methyl, ethyl, propyl, butyl, pentyl, ethenyl, propenyl, butenyl, or pentenyl. In still another embodiment, $X^{10}$ and $X^{11}$ independently can be methyl, ethyl, propyl, butyl, or pentyl (e.g., neopentyl), or both $X^{10}$ and $X^{11}$ can be methyl, or ethyl, or propyl, or butyl, or pentyl (e.g., neopentyl).

In some embodiments, $X^{11}$ can be a $C_1$ to $C_{18}$ hydrocarboxy group. A hydrocarboxy group is used generically herein to include, for instance, alkoxy, aryloxy, aralkoxy, -(alkyl, aryl, or aralkyl)-O-(alkyl, aryl, or aralkyl) groups, and —O(CO)-(hydrogen or hydrocarbyl) groups, and such groups which are suitable for $X^{11}$ typically can comprise up to about 18 carbon atoms (e.g., $C_1$ to $C_{18}$, $C_1$ to $C_{12}$, $C_1$ to $C_{10}$, or $C_1$ to $C_8$ hydrocarboxy groups). Illustrative and non-limiting examples of hydrocarboxy groups which can be $X^{11}$ in formula (I) can include, but are not limited to, a methoxy group, an ethoxy group, a n-propoxy group, an isopropoxy group, a n-butoxy group, a sec-butoxy group, an isobutoxy group, a tert-butoxy group, a n-pentoxy group, a 2-pentoxy group, a 3-pentoxy group, a 2-methyl-1-butoxy group, a tert-pentoxy group, a 3-methyl-1-butoxy group, a 3-methyl-2-butoxy group, a neo-pentoxy group, a phenoxy group, a toloxy group, a xyloxy group, a 2,4,6-trimethylphenoxy group, a benzoxy group, an acetylacetonate group (acac), a formate group, an acetate group, a stearate group, an oleate group, a benzoate group, and the like. In an embodiment, the hydrocarboxy group which can be $X^{11}$ in formula (I) can be a methoxy group; alternatively, an ethoxy group; alternatively, a n-propoxy group; alternatively, an isopropoxy group; alternatively, a n-butoxy group; alternatively, a sec-butoxy group; alternatively, an isobutoxy group; alternatively, a tert-butoxy group; alternatively, a n-pentoxy group; alternatively, a 2-pentoxy group; alternatively, a 3-pentoxy group; alternatively, a 2-methyl-1-butoxy group; alternatively, a tert-pentoxy group; alternatively, a 3-methyl-1-butoxy group, alternatively, a 3-methyl-2-butoxy group; alternatively, a neopentoxy group; alternatively, a phenoxy group; alternatively, a toloxy group; alternatively, a xyloxy group; alternatively, a 2,4,6-trimethylphenoxy group; alternatively, a benzoxy group; alternatively, an acetylacetonate group; alternatively, a formate group; alternatively, an acetate group; alternatively, a stearate group; alternatively, an oleate group; or alternatively, a benzoate group.

$X^{11}$ can be H, a halide, or a $C_1$ to $C_{18}$ hydrocarbyl or $C_1$ to $C_{18}$ hydrocarboxy group. In some embodiments, $X^{11}$ can be H, a halide (e.g., Cl), or a $C_1$ to $C_{12}$ hydrocarbyl or $C_1$ to $C_{12}$ hydrocarboxy group; alternatively, H, a halide, or a $C_1$ to $C_8$ hydrocarbyl or $C_1$ to $C_8$ hydrocarboxy group; or alternatively, H, Br, Cl, F, I, methyl, ethyl, propyl, butyl, pentyl (e.g., neopentyl), hexyl, heptyl, octyl, nonyl, decyl, ethenyl, propenyl, butenyl, pentenyl, hexenyl, heptenyl, octenyl, nonenyl, decenyl, phenyl, benzyl, tolyl, methoxy, ethoxy, propoxy, butoxy pentoxy, phenoxy, toloxy, xyloxy, or benzoxy.

In certain embodiments, the organozinc compound can be a di(hydrocarbylsilyl)zinc compound. Each hydrocarbyl (one or more) of the hydrocarbylsilyl group can be any hydrocarbyl group disclosed herein (e.g., a $C_1$ to $C_{18}$ alkyl group, a $C_2$ to $C_{18}$ alkenyl group, a $C_6$ to $C_{18}$ aryl group, a $C_7$ to $C_{18}$ aralkyl group, etc.). Illustrative and non-limiting examples of hydrocarbylsilyl groups can include, but are not limited to, trimethylsilyl, triethylsilyl, tripropylsilyl (e.g., triisopropylsilyl), tributylsilyl, tripentylsilyl, triphenylsilyl, allyldimethylsilyl, trimethylsilylmethyl, and the like.

In other embodiments, the organozinc compound can be dimethylzinc, diethylzinc, dipropylzinc, dibutylzinc, dineopentylzinc, di(trimethylsilyl)zinc, di(triethylsilyl)zinc, di(triisoproplysilyl)zinc, di(triphenylsilyl)zinc, di(allyldimethylsilyl)zinc, di(trimethylsilylmethyl)zinc, and the like, or combinations thereof; alternatively, dimethylzinc, diethylzinc, dipropylzinc, dibutylzinc, dineopentylzinc, di(trimethylsilylmethyl)zinc, or combinations thereof; alternatively, dimethylzinc; alternatively, diethylzinc; alternatively, dipropylzinc; alternatively, dibutylzinc; alternatively, dineopentylzinc; or alternatively, di(trimethylsilylmethyl)zinc.

Catalyst Systems

In some embodiments, the dual catalyst system can comprise a first metallocene catalyst component and a second metallocene catalyst component. The first metallocene catalyst component and the second metallocene catalyst component independently can comprise, for example, a transition metal (one or more than one) from Groups IIIB-VIIIB of the Periodic Table of the Elements. In one embodiment, the first metallocene catalyst component and the second metallocene catalyst component independently can comprise a Group III, IV, V, or VI transition metal, or a combination of two or more transition metals. The first metallocene catalyst component and the second metallocene catalyst component independently can comprise chromium, titanium, zirconium, hafnium, vanadium, or a combination thereof, or can comprise titanium, zirconium, hafnium, or a combination thereof, in other embodiments. Accordingly, the first metallocene catalyst component and the second metallocene catalyst component independently can comprise titanium, or zirconium, or hafnium, either singly or in combination.

In an embodiment, the first metallocene catalyst component can produce the lower molecular weight component of the olefin polymer, and the second metallocene catalyst component can produce the higher molecular weight component of the olefin polymer. These component terms are relative, are used in reference to each other, and are not limited to the actual molecular weights of the respective components. While not being limited thereto, the first metallocene catalyst component can comprise an unbridged metallocene compound (e.g., with zirconium or hafnium) such as those described in U.S. Pat. No. 7,619,047, the disclosure of which is incorporated herein by reference in its entirety.

In another embodiment, the first metallocene catalyst component can produce the lower molecular weight component of the olefin polymer, and the first metallocene catalyst component can comprise zirconium, or alternatively, hafnium. Representative and non-limiting examples of metallocene compounds that can be employed as the first metallocene compound can include, but are not limited to, the following (Ph=phenyl):

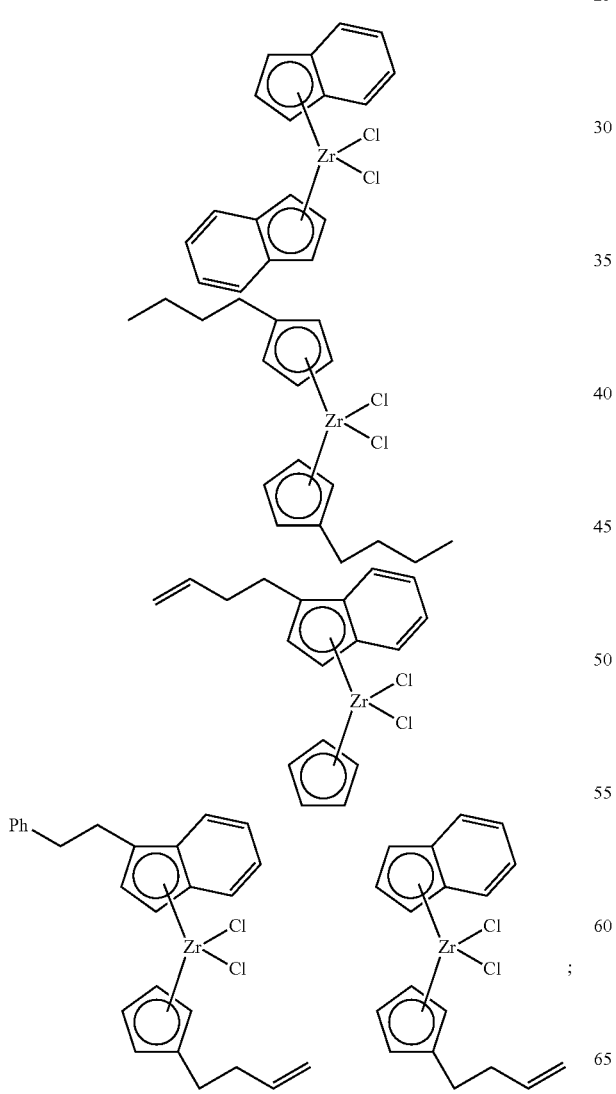

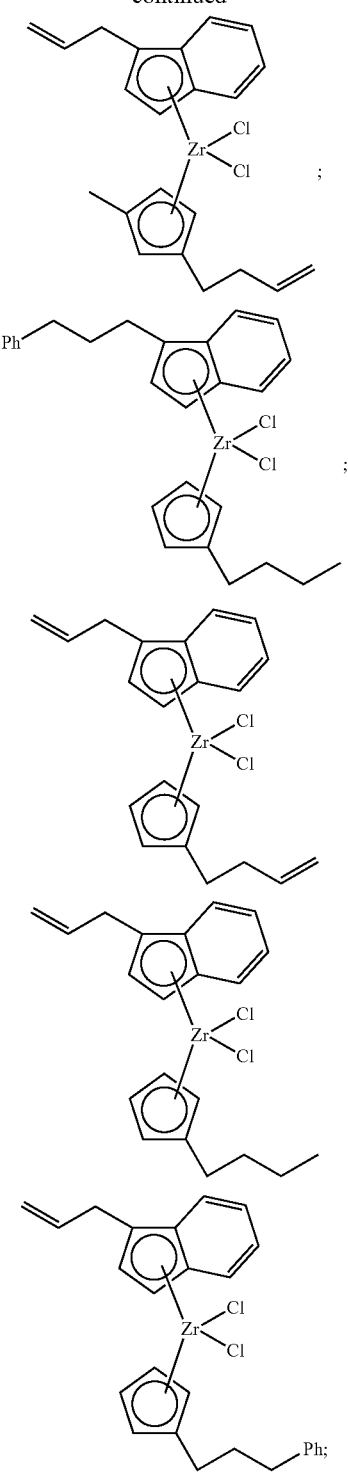

and the like, as well as combinations thereof.

Moreover, the first metallocene catalyst component can comprise an unbridged dinuclear metallocene such as those described in U.S. Pat. Nos. 7,919,639 and 8,080,681, the disclosures of which are incorporated herein by reference in their entirety. Representative and non-limiting dinuclear compounds can include the following:

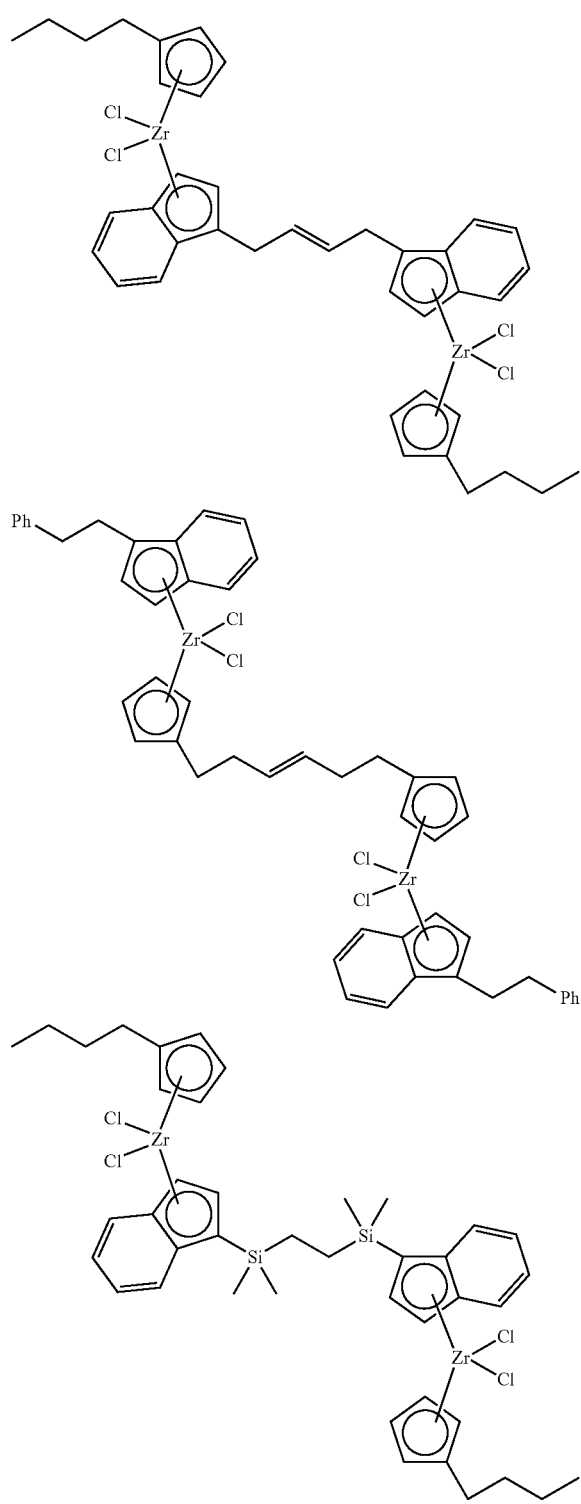
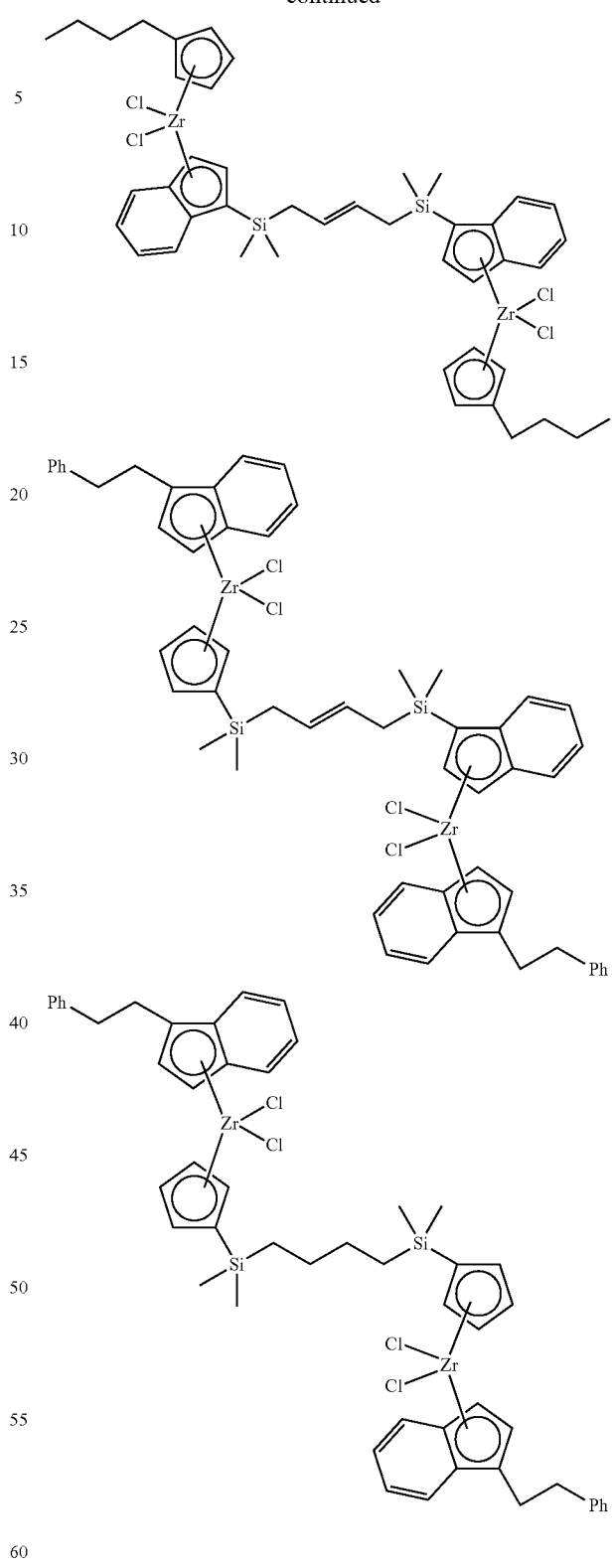

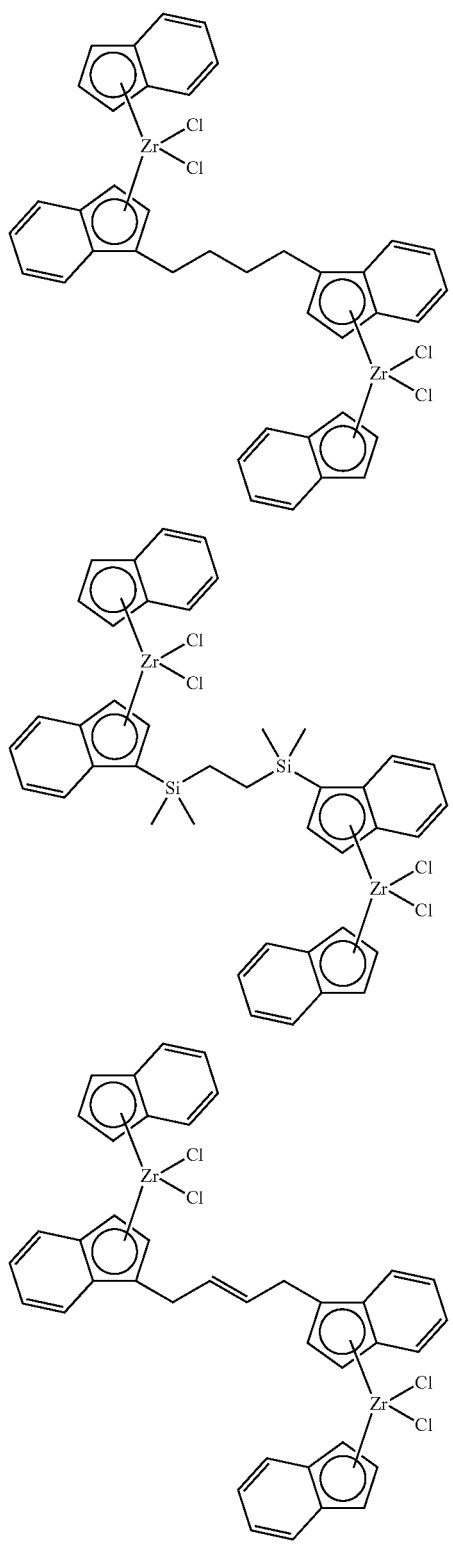
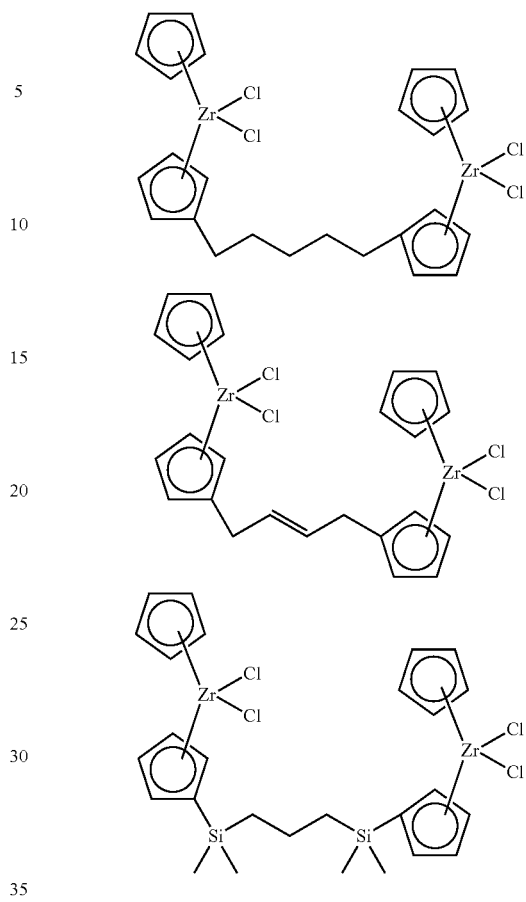

and the like, as well as combinations thereof.

While not being limited thereto, the second metallocene catalyst component can comprise a bridged metallocene (e.g., with titanium, zirconium, or hafnium) such as those described in U.S. Pat. Nos. 7,226,886 and 7,619,047, the disclosures of which are incorporated herein by reference in their entirety.

In another embodiment, the second metallocene catalyst component can produce the higher molecular weight component of the olefin polymer, and the second metallocene catalyst component can comprise zirconium and/or hafnium. Representative and non-limiting examples of metallocene compounds that can be employed as the second metallocene compound can include, but are not limited to, the following (Ph=phenyl, Me=methyl, and t-Bu=tert-butyl):

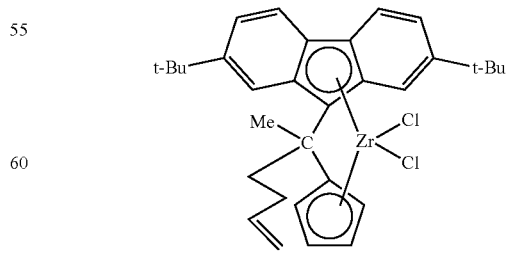

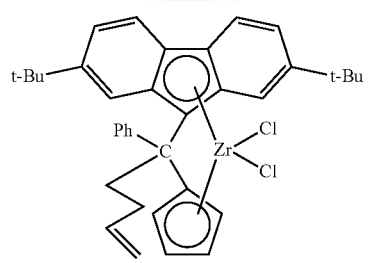
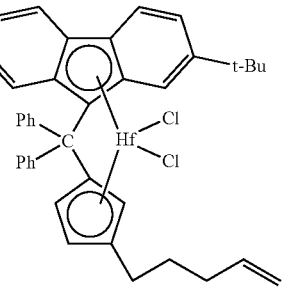
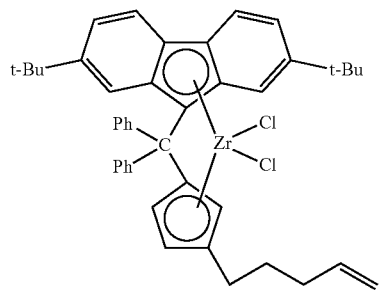
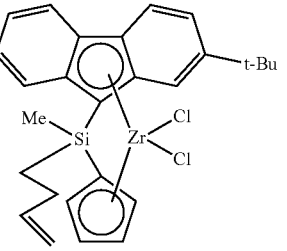
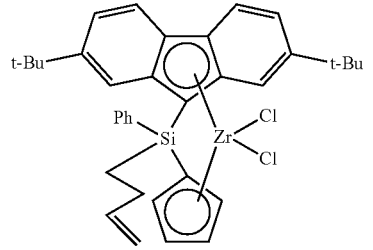
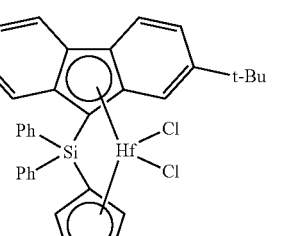
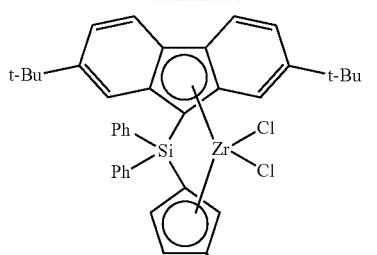
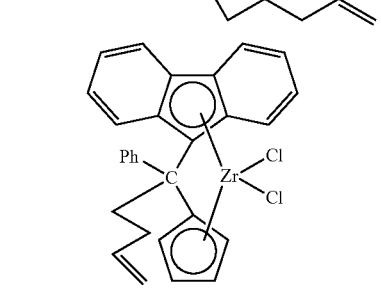
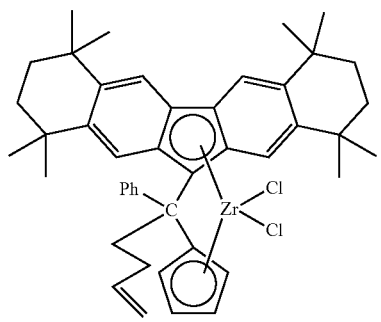
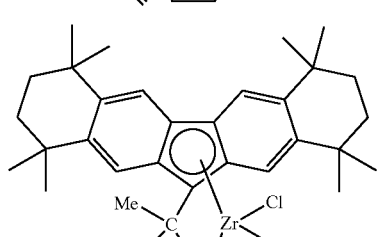
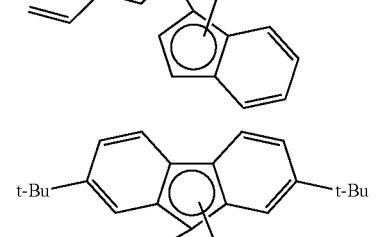
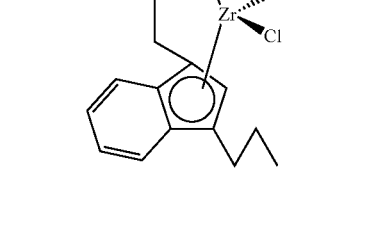

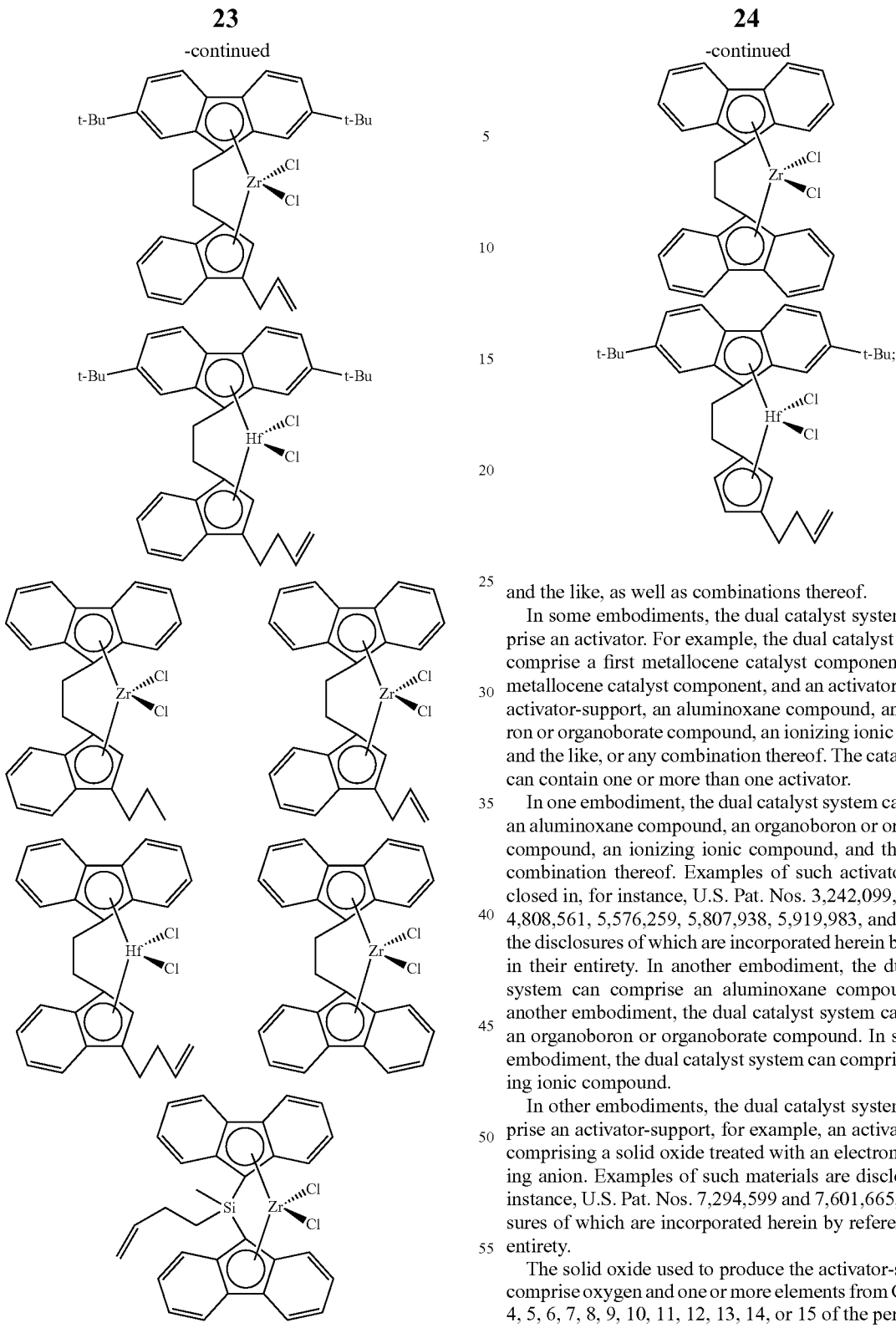

and the like, as well as combinations thereof.

In some embodiments, the dual catalyst system can comprise an activator. For example, the dual catalyst system can comprise a first metallocene catalyst component, a second metallocene catalyst component, and an activator, such as an activator-support, an aluminoxane compound, an organoboron or organoborate compound, an ionizing ionic compound, and the like, or any combination thereof. The catalyst system can contain one or more than one activator.

In one embodiment, the dual catalyst system can comprise an aluminoxane compound, an organoboron or organoborate compound, an ionizing ionic compound, and the like, or a combination thereof. Examples of such activators are disclosed in, for instance, U.S. Pat. Nos. 3,242,099, 4,794,096, 4,808,561, 5,576,259, 5,807,938, 5,919,983, and 8,114,946, the disclosures of which are incorporated herein by reference in their entirety. In another embodiment, the dual catalyst system can comprise an aluminoxane compound. In yet another embodiment, the dual catalyst system can comprise an organoboron or organoborate compound. In still another embodiment, the dual catalyst system can comprise an ionizing ionic compound.

In other embodiments, the dual catalyst system can comprise an activator-support, for example, an activator-support comprising a solid oxide treated with an electron-withdrawing anion. Examples of such materials are disclosed in, for instance, U.S. Pat. Nos. 7,294,599 and 7,601,665, the disclosures of which are incorporated herein by reference in their entirety.

The solid oxide used to produce the activator-support can comprise oxygen and one or more elements from Groups 2, 3, 4, 5, 6, 7, 8, 9, 10, 11, 12, 13, 14, or 15 of the periodic table, or comprising oxygen and one or more elements from the lanthanide or actinide elements (see e.g., Hawley's Condensed Chemical Dictionary, $11^{th}$ Ed., John Wiley & Sons, 1995; Cotton, F. A., Wilkinson, G., Murillo, C. A., and Bochmann, M., Advanced Inorganic Chemistry, $6^{th}$ Ed., Wiley-Interscience, 1999). For instance, the solid oxide can comprise oxygen and at least one element selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr.

Accordingly, suitable examples of solid oxide materials that can be used to form the activator-supports can include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof. This includes co-gels or co-precipitates of different solid oxide materials. The solid oxide can encompass oxide materials such as alumina, "mixed oxides" thereof such as silica-alumina, coatings of one oxide on another, and combinations and mixtures thereof. The mixed oxides such as silica-alumina can be single or multiple chemical phases with more than one metal combined with oxygen to form the solid oxide. Examples of mixed oxides that can be used to form an activator-support, either singly or in combination, can include, but are not limited to, silica-alumina, silica-titania, silica-zirconia, alumina-titania, alumina-zirconia, zinc-aluminate, alumina-boria, silica-boria, aluminophosphate-silica, titania-zirconia, and the like. The solid oxide used herein also can encompass oxide materials such as silica-coated alumina, as described in U.S. Pat. No. 7,884,163, the disclosure of which is incorporated herein by reference in its entirety.

Accordingly, in one embodiment, the solid oxide can comprise silica, alumina, silica-alumina, silica-coated alumina, aluminum phosphate, aluminophosphate, heteropolytungstate, titania, zirconia, magnesia, boria, zinc oxide, any mixed oxide thereof, or any combination thereof. In another embodiment, the solid oxide can comprise silica, alumina, titania, zirconia, magnesia, boria, zinc oxide, any mixed oxide thereof, or any combination thereof. In yet another embodiment, the solid oxide can comprise silica-alumina, silica-coated alumina, silica-titania, silica-zirconia, alumina-boria, or any combination thereof. In still another embodiment, the solid oxide can comprise silica; alternatively, alumina; alternatively, silica-alumina; or alternatively, silica-coated alumina The silica-alumina which can be used typically can have an alumina content from about 5 to about 95% by weight. In one embodiment, the alumina content of the silica-alumina can be from about 5 to about 50%, or from about 8% to about 30%, alumina by weight. In another embodiment, high alumina content silica-alumina materials can be employed, in which the alumina content of these silica-alumina materials typically can range from about 60% to about 90%, or from about 65% to about 80%, alumina by weight. According to yet another embodiment, the solid oxide component can comprise alumina without silica, and according to another embodiment, the solid oxide component can comprise silica without alumina. Moreover, as provided hereinabove, the solid oxide can comprise a silica-coated alumina. The solid oxide can have any suitable surface area, pore volume, and particle size, as would be recognized by those of skill in the art.

The electron-withdrawing component used to treat the solid oxide can be any component that increases the Lewis or Brønsted acidity of the solid oxide upon treatment (as compared to the solid oxide that is not treated with at least one electron-withdrawing anion). According to one embodiment, the electron-withdrawing component can be an electron-withdrawing anion derived from a salt, an acid, or other compound, such as a volatile organic compound, that serves as a source or precursor for that anion. Examples of electron-withdrawing anions can include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, and the like, including mixtures and combinations thereof. In addition, other ionic or non-ionic compounds that serve as sources for these electron-withdrawing anions also can be employed. It is contemplated that the electron-withdrawing anion can be, or can comprise, fluoride, chloride, bromide, phosphate, triflate, bisulfate, or sulfate, and the like, or any combination thereof, in some embodiments provided herein. In other embodiments, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or combinations thereof.

In an embodiment, the dual catalyst system can comprise an activator-support, and the activator-support can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, as well as any mixture or combination thereof. In another embodiment, the dual catalyst system can comprise an activator-support, and the activator-support can comprise fluorided alumina, sulfated alumina, fluorided silica-alumina, sulfated silica-alumina, fluorided silica-zirconia, fluorided silica-coated alumina, sulfated silica-coated alumina, and the like, as well as any mixture or combination thereof.

As described herein, the organozinc compound can be added to the polymerization reactor system (e.g., into a polymerization reactor) alone, with a carrier, with the dual catalyst system, etc., and the amount of the organozinc compound added to the reactor system is not particularly limited, so long as the amount of the organozinc compound added to the reactor system is sufficient to impact the HLMI/MI shear ratio and/or the Mz/Mw ratio of the olefin polymer as described herein. Nonetheless, while not being limited thereto, the amount of the organozinc compound added typically can be in a range of the weight of the organozinc compound to the weight of the activator-support of from about 2 to about 100 wt. % (i.e., for catalyst systems where an activator-support is employed, such as a solid oxide treated with an electron-withdrawing anion, fluorided silica-alumina, sulfated alumina, etc.). This weight ratio is based on the respective amounts of the organozinc compound and the activator-support fed into the reactor system (e.g., into a polymerization reactor). As a non-limiting example of 25 wt. %, in a continuous polymerization reactor system, the total amount of the activator-support component fed into the reactor(s) per time interval can be "W" lb/hour; thus, the amount of the organozinc compound fed into the reactor(s) would be equal to "0.25W" lb/hour for a 25 wt. % addition.

In some embodiments, the weight percent (weight of the organozinc compound fed into the reactor system based on the weight of the activator-support fed into the reactor system) can be in a range from about 2 to about 80 wt. %, from about 3 to about 80 wt. %, from about 4 to about 80 wt. %, or from about 5 to about 75 wt. %. In particular embodiments considered herein, the weight percent can be in a range from about 7 to about 70 wt. %, from about 7 to about 60 wt. %, from about 10 to about 70 wt. %, from about 10 to about 60 wt. %, from about 10 to about 50 wt. %, from about 15 to about 75 wt. %, from about 15 to about 50 wt. %, from about 10 to about 40 wt. %, from about 20 to about 60 wt. %, or from about 20 to about 40 wt. %.

Commonly used polymerization co-catalysts can include, but are not limited to, metal alkyl, or organometal, co-catalysts, with the metal encompassing boron, aluminum, and the like. The dual catalyst systems provided herein can comprise a co-catalyst, or a combination of co-catalysts. For instance, alkyl boron and/or alkyl aluminum compounds often can be used as co-catalysts in such catalyst systems. Representative boron compounds can include, but are not limited to, tri-n-butyl borane, tripropylborane, triethylborane, and the like, and this include combinations of two or more of these materials. While not being limited thereto, representative aluminum compounds (e.g., organoaluminum compounds) can include trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, as well as any combination thereof. Thus, a dual catalyst system provided herein can comprise a first metallocene catalyst component, a second metallocene catalyst component, an activator, and a co-catalyst. Hence, the co-catalyst can comprise an organoaluminum compound, such as trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof; and the activator can comprise fluorided alumina, sulfated alumina, fluorided silica-alumina, sulfated silica-alumina, fluorided silica-zirconia, fluorided silica-coated alumina, sulfated silica-coated alumina, or any combination thereof, in certain embodiments.

Olefin Monomers and Olefin Polymers

Olefin monomers contemplated herein typically include olefin compounds having from 2 to 30 carbon atoms per molecule and having at least one olefinic double bond. Homopolymerization processes using a single olefin, such as ethylene, propylene, butene, hexene, octene, and the like, are encompassed, as well as copolymerization, terpolymerization, etc., reactions using an olefin monomer with at least one different olefinic compound. As previously disclosed, polymerization processes are meant to encompass oligomerization processes as well.

As an example, any resultant ethylene copolymers, terpolymers, etc., generally can contain a major amount of ethylene (>50 mole percent) and a minor amount of comonomer (<50 mole percent). Comonomers that can be copolymerized with ethylene often have from 3 to 20 carbon atoms, or from 3 to 10 carbon atoms, in their molecular chain.

Acyclic, cyclic, polycyclic, terminal ($\alpha$), internal, linear, branched, substituted, unsubstituted, functionalized, and non-functionalized olefins can be employed. For example, typical unsaturated compounds that can be polymerized to produce olefin polymers can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene also can be employed as a monomer or as a comonomer. In an embodiment, the olefin monomer can comprise a $C_2$-$C_{20}$ olefin; alternatively, a $C_2$-$C_{20}$ $\alpha$-olefin; alternatively, a $C_2$-$C_{12}$ olefin; alternatively, a $C_2$-$C_{10}$ $\alpha$-olefin; alternatively, ethylene, propylene, 1-butene, 1-hexene, or 1-octene; alternatively, ethylene or propylene; alternatively, ethylene; or alternatively, propylene.

When a copolymer (or alternatively, a terpolymer) is desired, the olefin monomer can be, for example, ethylene or propylene, which is copolymerized with at least one comonomer (e.g., a $C_2$-$C_{20}$ $\alpha$-olefin, a $C_3$-$C_{20}$ $\alpha$-olefin, etc.). According to one embodiment, the olefin monomer in the polymerization process can be ethylene. In this embodiment, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to one embodiment, the comonomer can comprise an $\alpha$-olefin (e.g., a $C_3$-$C_{10}$ $\alpha$-olefin), while in another embodiment, the comonomer can comprise 1-butene, 1-pentene, 1-hexene, 1-octene, 1-decene, styrene, or any combination thereof. For example, the comonomer can comprise 1-butene, 1-hexene, 1-octene, or a combination thereof.

Generally, the amount of comonomer introduced into a polymerization reactor to produce the copolymer can be from about 0.01 to about 50 weight percent of the comonomer based on the total weight of the monomer and comonomer. According to another embodiment, the amount of comonomer introduced into a polymerization reactor can be from about 0.01 to about 40 weight percent comonomer based on the total weight of the monomer and comonomer. In still another embodiment, the amount of comonomer introduced into a polymerization reactor can be from about 0.1 to about 35 weight percent comonomer based on the total weight of the monomer and comonomer. Yet, in another embodiment, the amount of comonomer introduced into a polymerization reactor can be from about 0.5 to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization reaction. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one embodiment, at least one monomer/reactant can be ethylene, so the polymerization reaction can be a homopolymerization involving only ethylene, or a copolymerization with a different acyclic, cyclic, terminal, internal, linear, branched, substituted, or unsubstituted olefin. In addition, the methods disclosed herein intend for olefin to also encompass diolefin compounds that include, but are not limited to, 1,3-butadiene, isoprene, 1,4-pentadiene, 1,5-hexadiene, and the like.

Olefin polymers encompassed herein can include any polymer (or oligomer) produced from any olefin monomer (and optional comonomer(s)) described herein. For example, the olefin polymer can comprise an ethylene homopolymer, a propylene homopolymer, an ethylene copolymer (e.g., ethylene/$\alpha$-olefin, ethylene/1-butene, ethylene/1-hexene, ethylene/1-octene, etc.), a propylene copolymer, an ethylene terpolymer, a propylene terpolymer, and the like, including combinations thereof. Moreover, additional polymer components can be present in the olefin polymer, in addition to the higher molecular weight component and the lower molecular weight component. Accordingly, in one embodiment, the olefin polymer can have a bimodal molecular weight distribution, while in another embodiment, the olefin polymer can have a multimodal molecular weight distribution. In yet another embodiment, the olefin polymer can have a unimodal molecular weight distribution.

Polymerization Reactor Systems

The disclosed methods and processes are intended for any olefin polymerization process using various types of polymerization reactors, polymerization reactor systems, and polymerization reaction conditions. As used herein, "polymerization reactor" includes any polymerization reactor capable of polymerizing (inclusive of oligomerizing) olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof. Suitable polymerization conditions are used for the various reactor types. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Polymerization reactor systems and processes also can include partial or full direct recycle of unreacted monomer, unreacted comonomer, and/or diluent.

A polymerization reactor system can comprise a single reactor or multiple reactors (2 reactors, more than 2 reactors, etc.) of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor (s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both.

According to one embodiment, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another embodiment, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another embodiment, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another embodiment, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, load-out, laboratory analysis, and process control. Depending upon the desired properties of the olefin polymer, hydrogen can be added to the polymerization reactor as needed (e.g., continuously, pulsed, etc.), and as discussed hereinabove.

Polymerization conditions that can be controlled for efficiency and to provide desired polymer properties can include temperature, pressure, and the concentrations of various reactants. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, or from about 60° C. to about 120° C., depending upon the type of polymerization reactor. In some reactor systems, the polymerization temperature generally can be within a range from about 70° C. to about 110° C., or from about 75° C. to about 95° C.

Suitable pressures will also vary according to the reactor and polymerization type. The pressure for liquid phase polymerizations in a loop reactor typically can be less than 1000 psig. The pressure for gas phase polymerization can be in the 200 to 500 psig range. High pressure polymerization in tubular or autoclave reactors generally can be conducted at about 20,000 to 75,000 psig. Polymerization reactors also can be operated in a supercritical region occurring at generally higher temperatures and pressures. Operation above the critical point of a pressure/temperature diagram (supercritical phase) can offer advantages.

EXAMPLES

Embodiments of the invention are further illustrated by the following examples, which are not to be construed in any way as imposing limitations to the scope of this invention described herein. Various other aspects, embodiments, modifications, and equivalents thereof which, after reading the description herein, can suggest themselves to one of ordinary skill in the art without departing from the spirit of the present invention or the scope of the appended claims.

Melt index (MI, g/10 min) was determined in accordance with ASTM D1238 at 190° C. with a 2,160 gram weight. High load melt index (HLMI, g/10 min) was determined in accordance with ASTM D1238 at 190° C. with a 21,600 gram weight.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, Mass.) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 hr with occasional and gentle agitation, before the solutions were transferred to sample vials for injection. The integral calibration method was used to deduce molecular weights and molecular weight distributions using a Chevron Phillips Chemicals Company's HDPE polyethylene resin, MARLEX BHB5003, as the broad standard. The integral table of the broad standard was pre-determined in a separate experiment with SEC-MALS. Mn is the number-average molecular weight, Mw is the weight-average molecular weight, Mz is the z-average molecular weight, and Mp is the peak molecular weight.

Sulfated alumina activator-supports were prepared as follows. Bohemite was obtained from W.R. Grace & Company under the designation "Alumina A" and having a surface area of about 300 m²/g and a pore volume of about 1.3 mL/g This material was obtained as a powder having an average particle size of about 100 microns. This material was impregnated to incipient wetness with an aqueous solution of ammonium sulfate to equal about 15% sulfate. This mixture was then placed in a flat pan and allowed to dry under vacuum at approximately 110° C. for about 16 hours. To calcine the resultant powdered mixture, the material was fluidized in a stream of dry air at about 550° C. for about 6 hours. Afterward, the sulfated alumina was collected and stored under dry nitrogen, and was used without exposure to the atmosphere.

Examples 1-5

Impact of the Addition of Diethyl Zinc (DEZ) on the Melt Flow and Molecular Weight Properties of an Ethylene/1-Hexene Copolymer.

The polymerization experiments of Examples 1-5 were conducted in a one-gallon (3.8-L) stainless steel reactor with 2 L of isobutane. Metallocene solutions (nominal 1 mg/mL) of MET-A and MET-B were prepared by dissolving 15 mg of the respective metallocene in 15 mL of toluene. Metallocene compounds MET-A and MET-B had the following structures:

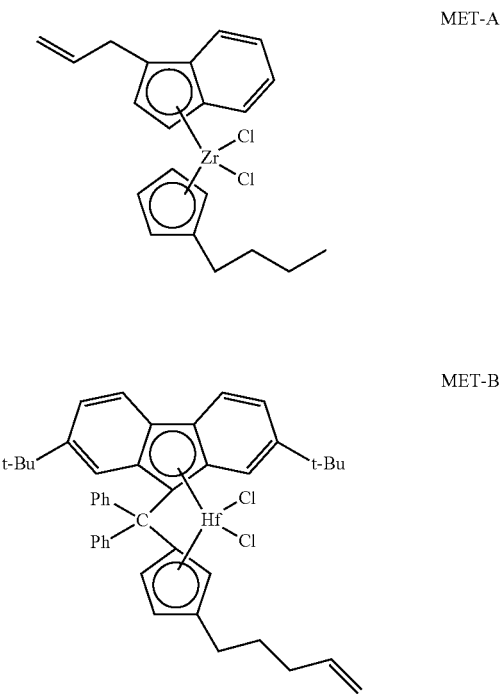

Approximately 2 mg of MET-A and 2 mg of MET-B (a 1:1 weight ratio) were used in Examples 1-5, and the MET-A and MET-B metallocene solutions were premixed before they were charged into the reactor.

The polymerization experiments were performed as follows. First, 0.9 mmol of triisobutylaluminum (TIBA), 300 mg of sulfated alumina, and the premixed metallocene solution containing MET-A and MET-B were added in that order through a charge port while slowly venting isobutane vapor. Next, the DEZ was added. The charge port was closed and 2 L of isobutane were added. The contents of the reactor were stirred and heated to the desired polymerization reaction temperature of 95° C., and ethylene was then introduced into the reactor with 10 g of 1-hexene and hydrogen ($H_2$) at 300 ppm by weight of the ethylene. Ethylene and hydrogen were fed on demand at the specified weight ratio to maintain the target pressure of 420 psig pressure for the 45 minute length of each polymerization experiment. The reactor was maintained at the desired reaction temperature throughout the experiment by an automated heating-cooling system.

Table I summarizes the amount of DEZ added, the amount of polymer produced, and the melt flow and molecular weight characteristics of the polymers of Examples 1-5. As shown in Table I, and unexpectedly, the addition of DEZ decreased the HLMI/MI shear ratio and increased the Mz/Mw ratio of the polymer.

The impact of DEZ addition on the molecular weight distributions (amount of polymer versus logarithm of molecular weight) of the polymers of Examples 1-5 is illustrated graphically in the FIGURE. As shown in the FIGURE, and unexpectedly, the addition of DEZ decreased the weight ratio of the higher molecular weight (HMW) component to the lower molecular weight component (e.g., relatively more lower molecular weight material was produced). Moreover, the peak molecular weight of the lower molecular weight component increased with DEZ addition, while the peak molecular weight of the higher molecular weight component was not substantially affected.

Table I. Summary of Examples 1-5.

TABLE I

Summary of Examples 1-5.

| Example | 1 | 2 | 3 | 4 | 5 |
|---|---|---|---|---|---|
| DEZ (mmol) | 0 | 0.1 | 0.2 | 0.4 | 1.0 |
| PE Produced (g) | 123 | 115 | 155 | 143 | 99 |
| MI (g/10 min) | 0.12 | 0.13 | 0.08 | 0.18 | 0.90 |
| HLMI (g/10 min) | 47.1 | 45.4 | 18.5 | 23.2 | 60.8 |
| HLMI/MI | 392 | 349 | 232 | 129 | 68 |
| Mn/1000 (g/mol) | 9.6 | 7.7 | 14.9 | 12.8 | 17.1 |
| Mw/1000 (g/mol) | 194.9 | 193.6 | 224.8 | 202.6 | 141.6 |
| Mz/1000 (g/mol) | 801.4 | 940.4 | 1117.8 | 1026.1 | 662.4 |
| Mp/1000 (g/mol) | 16.3 | 20.7 | 23.8 | 31.8 | 48.8 |
| Mw/Mn | 20.3 | 25.2 | 15.1 | 15.8 | 8.3 |
| Mz/Mw | 4.1 | 4.9 | 5.0 | 5.1 | 4.7 |

The invention has been described above with reference to numerous embodiments and specific examples. Many variations will suggest themselves to those skilled in the art in light of the above detailed description. All such obvious variations are within the full intended scope of the appended claims. Other embodiments of the invention can include, but are not limited to, the following:

Embodiment 1. A method of controlling a polymerization reaction in a polymerization reactor system, the method comprising:

(i) contacting a dual catalyst system with an olefin monomer and an optional olefin comonomer in the polymerization reactor system under polymerization conditions to produce an olefin polymer, wherein the dual catalyst system comprises a first metallocene catalyst component and a second metallocene catalyst component, and (ii) introducing an amount of an organozinc compound into the polymerization reactor system to reduce a HLMI/MI shear ratio and/or to increase a Mz/Mw ratio of the olefin polymer.

Embodiment 2. A process for producing an olefin polymer with a target HLMI/MI shear ratio and/or a target Mz/Mw ratio, the process comprising:

(a) contacting a dual catalyst system with an olefin monomer and an optional olefin comonomer in a polymerization reactor system under polymerization conditions, wherein the dual catalyst system comprises a first metallocene catalyst component and a second metallocene catalyst component, and (b) controlling an amount of an organozinc compound introduced into the polymerization reactor system to produce the olefin polymer with the target HLMI/MI shear ratio and/or the target Mz/Mw ratio.

Embodiment 3. The method or process defined in embodiment 1 or 2, wherein the amount of the organozinc compound is in any range of molar ratios disclosed herein, based on the moles of the organozinc compound to the total moles of the first metallocene catalyst component and the second metallocene catalyst component, e.g., from about 5:1 to about 200:1, from about 10:1 to about 150:1, from about 30:1 to about 120:1, etc.

Embodiment 4. The method or process defined in any one of embodiments 1-3, wherein the organozinc compound comprises any organozinc compound disclosed herein, e.g., a compound having the formula:

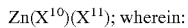

$Zn(X^{10})(X^{11})$; wherein:

$X^{10}$ is a $C_1$ to $C_{18}$ hydrocarbyl group; and $Z^{11}$ is H, a halide, a $C_1$ to $C_{18}$ hydrocarbyl group, or a $C_1$ to $C_{18}$ hydrocarboxy group.

Embodiment 5. The method or process defined in any one of embodiments 1-4, wherein the organozinc compound comprises dimethylzinc, diethylzinc, dipropylzinc, dibutylzinc, dineopentylzinc, di(trimethylsilyl)zinc, di(triethylsilyl)zinc, di(triisoproplysilyl)zinc, di(triphenylsilyl)zinc, di(allyldimethylsilyl)zinc, di(trimethylsilylmethyl)zinc, or a combination thereof.

Embodiment 6. The method or process defined in any one of embodiments 1-5, wherein the organozinc compound comprises diethylzinc.

Embodiment 7. The method or process defined in any one of embodiments 1-6, wherein the catalyst system comprises any first metallocene catalyst component, any second metallocene catalyst component, and any activator disclosed herein, e.g., an activator-support, an aluminoxane compound, an organoboron or organoborate compound, an ionizing ionic compound, etc., or any combination thereof.

Embodiment 8. The method or process defined in embodiment 7, wherein the activator comprises an aluminoxane compound.

Embodiment 9. The method or process defined in embodiment 7, wherein the activator comprises an organoboron or organoborate compound.

Embodiment 10. The method or process defined in embodiment 7, wherein the activator comprises an ionizing ionic compound.

Embodiment 11. The method or process defined in embodiment 7, wherein the activator comprises an activator-support comprising a solid oxide treated with an electron-withdrawing anion, for example, an activator-support comprising any solid oxide treated with any electron-withdrawing anion disclosed herein.

Embodiment 12. The method or process defined in embodiment 11, wherein the solid oxide comprises silica, alumina, silica-alumina, silica-coated alumina, aluminum phosphate, aluminophosphate, heteropolytungstate, titania, zirconia, magnesia, boria, zinc oxide, a mixed oxide thereof, or any mixture thereof; and the electron-withdrawing anion comprises sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, or any combination thereof.

Embodiment 13. The method or process defined in embodiment 11, wherein the activator-support comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or any combination thereof.

Embodiment 14. The method or process defined in embodiment 11, wherein the activator-support comprises fluorided alumina, sulfated alumina, fluorided silica-alumina, sulfated silica-alumina, fluorided silica-zirconia, fluorided silica-coated alumina, sulfated silica-coated alumina, or any combination thereof.

Embodiment 15. The method or process defined in any one of embodiments 11-14, wherein the amount of the organozinc compound is in any range of weight percentages disclosed herein, based on the weight of the organozinc compound to the weight of the activator-support added, e.g., from about 2 to about 100 wt. %, from about 4 to about 80 wt. %, from about 10 to about 60 wt. %, etc.

Embodiment 16. The method or process defined in any one of embodiments 1-15, wherein the catalyst system comprises any first metallocene catalyst component, any second metallocene catalyst component, any activator, and any organoaluminum compound disclosed herein.

Embodiment 17. The method or process defined in embodiment 16, wherein the organoaluminum compound comprises trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

Embodiment 18. The method or process defined in embodiment 16 or 17, wherein the activator comprises fluorided alumina, sulfated alumina, fluorided silica-alumina, sulfated silica-alumina, fluorided silica-zirconia, fluorided silica-coated alumina, sulfated silica-coated alumina, or any combination thereof.

Embodiment 19. The method or process defined in any one of embodiments 1-18, wherein the polymerization reactor system comprises a batch reactor, a slurry reactor, a gas-phase reactor, a solution reactor, a high pressure reactor, a tubular reactor, an autoclave reactor, or a combination thereof.

Embodiment 20. The method or process defined in any one of embodiments 1-19, wherein the polymerization reactor system comprises a slurry reactor, a gas-phase reactor, a solution reactor, or a combination thereof.

Embodiment 21. The method or process defined in any one of embodiments 1-20, wherein the polymerization reactor system comprises a loop slurry reactor.

Embodiment 22. The method or process defined in any one of embodiments 1-21, wherein the polymerization reactor system comprises a single reactor.

Embodiment 23. The method or process defined in any one of embodiments 1-21, wherein the polymerization reactor system comprises 2 reactors.

Embodiment 24. The method or process defined in any one of embodiments 1-21, wherein the polymerization reactor system comprises more than 2 reactors.

Embodiment 25. The method or process defined in any one of embodiments 1-24, wherein the olefin monomer comprises a $C_2$-$C_{20}$ olefin.

Embodiment 26. The method or process defined in any one of embodiments 1-25, wherein the olefin monomer and the optional olefin comonomer independently comprise a $C_2$-$C_{20}$ alpha-olefin.

Embodiment 27. The method or process defined in any one of embodiments 1-26, wherein the olefin monomer comprises ethylene.

Embodiment 28. The method or process defined in any one of embodiments 1-27, wherein the catalyst system is contacted with ethylene and a $C_3$-$C_{10}$ alpha-olefin comonomer.

Embodiment 29. The method or process defined in any one of embodiments 1-28, wherein the catalyst system is contacted with ethylene and a comonomer selected from 1-butene, 1-hexene, 1-octene, or a mixture thereof.

Embodiment 30. The method or process defined in any one of embodiments 1-29, wherein the olefin polymer in step (ii) and/or step (b) has a multimodal molecular weight distribution.

Embodiment 31. The method or process defined in any one of embodiments 1-29, wherein the olefin polymer in step (ii) and/or step (b) has a bimodal molecular weight distribution.

Embodiment 32. The method or process defined in any one of embodiments 1-29, wherein the olefin polymer in step (ii) and/or step (b) has a unimodal molecular weight distribution.

Embodiment 33. The method or process defined in any one of embodiments 1-32, wherein the melt index (MI) of the olefin polymer in step (ii) and/or step (b) is in any range disclosed herein, e.g., from about 0.005 to about 2 g/10 min, from about 0.01 to about 1 g/10 min, from about 0.05 to about 0.5 g/10 min, etc.

Embodiment 34. The method or process defined in any one of embodiments 1-33, wherein the number-average molecular weight (Mn) of the olefin polymer in step (ii) and/or step (b) is in any range disclosed herein, e.g., from about 5,000 to about 25,000 g/mol, from about 6,000 to about 20,000 g/mol, from about 7,000 to about 18,000 g/mol, etc.

Embodiment 35. The method or process defined in any one of embodiments 1-34, wherein the weight-average molecular weight (Mw) of the olefin polymer in step (ii) and/or step (b) is in any range disclosed herein, e.g., from about 100,000 to about 300,000 g/mol, from about 100,000 to about 275,000 g/mol, or from about 125,000 to about 250,000 g/mol.

Embodiment 36. The method or process defined in any one of embodiments 1-35, wherein the Mw/Mn ratio of the olefin polymer in step (ii) and/or step (b) is in any range disclosed herein, e.g., from about 5 to about 40, from about 6 to about 35, from about 7 to about 30, from about 8 to about 28, etc.

Embodiment 37. The method or process defined in any one of embodiments 1-36, wherein the olefin polymer is an ethylene/1-butene copolymer, an ethylene/1-hexene copolymer, or an ethylene/1-octene copolymer.

Embodiment 38. The method or process defined in any one of embodiments 1-37, wherein the olefin polymer is an ethylene/1-hexene copolymer.

Embodiment 39. The method or process defined in any one of embodiments 1-38, wherein the first metallocene catalyst component and the second metallocene catalyst component independently comprise chromium, vanadium, titanium, zirconium, hafnium, or a combination thereof.

Embodiment 40. The method or process defined in any one of embodiments 1-39, wherein the first metallocene catalyst component and the second metallocene catalyst component independently comprise titanium, zirconium, hafnium, or a combination thereof.

Embodiment 41. The method or process defined in any one of embodiments 1-40, wherein the first metallocene catalyst component comprises any first metallocene catalyst compo- Embodiment 42. The method or process defined in any one of embodiments 1-41, wherein the first metallocene catalyst component comprises zirconium.

Embodiment 43. The method or process defined in any one of embodiments 1-42, wherein the second metallocene catalyst component comprises any second metallocene catalyst component disclosed herein, e.g., a bridged metallocene compound, etc.

Embodiment 44. The method or process defined in any one of embodiments 1-43, wherein the second metallocene catalyst component comprises zirconium and/or hafnium.

Embodiment 45. The method or process defined in any one of embodiments 1-44, wherein a weight ratio of the first metallocene catalyst component to the second metallocene catalyst component is substantially constant, for example, for a particular polymer grade.

Embodiment 46. The method or process defined in any one of embodiments 1-44, further comprising a step of adjusting a weight ratio of the first metallocene catalyst component to the second metallocene catalyst component.

Embodiment 47. The method or process defined in any one of embodiments 1-46, wherein the polymerization conditions comprise a polymerization reaction temperature in a range from about 60° C. to about 120° C. and a reaction pressure in a range from about 200 to about 1000 psig (about 1.4 to about 6.9 MPa).

Embodiment 48. The method or process defined in any one of embodiments 1-47, wherein the polymerization conditions are substantially constant, for example, for a particular polymer grade.

Embodiment 49. The method or process defined in any one of embodiments 1-47, further comprising a step of adjusting at least one polymerization condition, e.g., temperature, pressure, residence time, etc.

Embodiment 50. The method or process defined in any one of embodiments 1-49, wherein no hydrogen is added to the polymerization reactor system.

Embodiment 51. The method or process defined in any one of embodiments 1-49, wherein hydrogen is added to the polymerization reactor system, and the hydrogen addition is substantially constant, for example, for a particular polymer grade.

Embodiment 52. The method or process defined in any one of embodiments 1-49, further comprising a step of adding hydrogen to the polymerization reactor system to adjust the weight-average molecular weight (Mw) of the polymer.

Embodiment 53. The method or process defined in any one of embodiments 1-49, further comprising a step of adding hydrogen to the polymerization reactor system to adjust the melt index (MI) of the polymer.

Embodiment 54. The method or process defined in any one of embodiments 51-53, wherein the step of adding hydrogen decreases the Mw and/or increases the melt index of the polymer.

Embodiment 55. The method or process defined in any one of embodiments 1-54, further comprising the steps of determining (or measuring) the HLMI/MI shear ratio, and adjusting the amount of the organozinc compound introduced into the polymerization reactor system based on the difference between the measured HLMI/MI shear ratio and the target HLMI/MI shear ratio.

Embodiment 56. The method or process defined in any one of embodiments 1-55, further comprising the steps of determining (or measuring) the Mz/Mw ratio, and adjusting the amount of the organozinc compound introduced into the polymerization reactor system based on the difference between the measured Mz/Mw ratio and the target Mz/Mw ratio.

Embodiment 57. The method or process defined in any one of embodiments 1-56, wherein the olefin polymer comprises a higher molecular weight component and a lower molecular weight component.

Embodiment 58. The method or process defined in embodiment 57, wherein introducing the organozinc compound into the polymerization reactor system reduces the weight ratio of the higher molecular weight component to the lower molecular weight component.

Embodiment 59. The method or process defined in embodiment 57 or 58, wherein introducing the organozinc compound into the polymerization reactor system increases the peak molecular weight of the lower molecular weight component.

Embodiment 60. The method or process defined in any one of embodiments 57-59, wherein introducing the organozinc compound into the polymerization reactor system has substantially no effect on the peak molecular weight of the higher molecular weight component.

Embodiment 61. The method or process defined in any one of embodiments 57-60, wherein the first metallocene catalyst component produces the lower molecular weight component.

Embodiment 62. The method or process defined in any one of embodiments 57-61, wherein the second metallocene catalyst component produces the higher molecular weight component.

Embodiment 63. The method or process defined in any one of embodiments 1-62, wherein the organozinc compound is introduced into the polymerization reactor system continuously.

Embodiment 64. The method or process defined in any one of embodiments 1-62, wherein the organozinc compound is introduced into the polymerization reactor system periodically.

Embodiment 65. The method or process defined in any one of embodiments 1-64, wherein the weight ratio of the first metallocene catalyst component to the second metallocene catalyst component is in any range of weight ratios disclosed herein, e.g., from about 1:100 to about 100:1, from about 1:5 to about 5:1, from about 1:2 to about 2:1, etc.

Embodiment 66. The method or process defined in any one of embodiments 1-65, wherein the HLMI/MI shear ratio of the olefin polymer decreases as the amount of the organozinc compound added to the polymerization reactor system increases.

Embodiment 67. The method or process defined in any one of embodiments 1-66, wherein the Mz/Mw ratio of the olefin polymer increases as the amount of the organozinc compound added to the polymerization reactor system increases.

We claim:

1. A method of controlling a polymerization reaction in a polymerization reactor system, the method comprising:
   (i) contacting a dual catalyst system with an olefin monomer and an optional olefin comonomer in the polymerization reactor system under polymerization conditions to produce an olefin polymer,
   wherein the dual catalyst system comprises a first metallocene catalyst component and a second metallocene catalyst component; and
   (ii) introducing an amount of an organozinc compound into the polymerization reactor system to reduce a HLMI/MI shear ratio and/or to increase a Mz/Mw ratio of the olefin polymer.

2. The method of claim 1, wherein the organozinc compound comprises a compound having the formula:

$Zn(X^{10})(X^{11})$; wherein:

$X^{10}$ is a $C_1$ to $C_{18}$ hydrocarbyl group; and $X^{11}$ is H, a halide, a $C_1$ to $C_{18}$ hydrocarbyl group, or a $C_1$ to $C_{18}$ hydrocarboxy group.

3. The method of claim 1, wherein the dual catalyst system comprises:
   a first metallocene catalyst component comprising an unbridged metallocene compound containing zirconium or an unbridged dinuclear metallocene compound containing zirconium;
   a second metallocene catalyst component comprising a bridged metallocene compound containing zirconium or hafnium; and
   an activator comprising an activator-support, an aluminoxane compound, an organoboron or organoborate compound, an ionizing ionic compound, or any combination thereof.

4. The method of claim 3, wherein:
   the activator comprises an activator-support comprising fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or any combination thereof; and
   the amount of the organozinc compound introduced into the polymerization reactor system is in a range from about 2 to about 100 wt. %, based on the weight of the activator-support added to the polymerization reactor system.

5. The method of claim 1, wherein the polymerization reactor system comprises a slurry reactor, a gas-phase reactor, a solution reactor, or a combination thereof.

6. The method of claim 1, wherein the polymerization reactor system comprises a single reactor.

7. The method of claim 1, wherein the olefin monomer comprises ethylene and the olefin comonomer comprises a $C_3$-$C_{10}$ alpha-olefin.

8. The method of claim 1, further comprising:
   determining the HLMI/MI shear ratio, and adjusting the amount of the organozinc compound introduced into the polymerization reactor system based on the difference between the determined HLMI/MI shear ratio and a target HLMI/MI shear ratio; or
   determining the Mz/Mw ratio, and adjusting the amount of the organozinc compound introduced into the polymerization reactor system based on the difference between the determined Mz/Mw ratio and a target Mz/Mw ratio; or
   both.

9. The method of claim 1, wherein a weight ratio of the first metallocene catalyst component to the second metallocene catalyst component is in a range of from about 1:10 to about 10:1.

10. The method of claim 1, wherein a weight ratio of the first metallocene catalyst component to the second metallocene catalyst component is substantially constant.

11. The method of claim 1, wherein the amount of the organozinc compound introduced into the polymerization reactor system is in a molar ratio range of from about 5:1 to about 200:1, based on the ratio of the moles of the organozinc compound to the total moles of the first metallocene catalyst component and the second metallocene catalyst component added to the polymerization reactor system.

12. The method of claim 1, further comprising:
   a step of adjusting a weight ratio of the first metallocene catalyst component to the second metallocene catalyst component; or
   a step of adding hydrogen to the polymerization reactor system to adjust a molecular weight parameter and/or a melt index of the olefin polymer; or
   both.

13. A process for producing an olefin polymer with a target HLMI/MI shear ratio and/or a target Mz/Mw ratio, the process comprising:
   (a) contacting a dual catalyst system with an olefin monomer and an optional olefin comonomer in a polymerization reactor system under polymerization conditions, wherein the dual catalyst system comprises a first metallocene catalyst component and a second metallocene catalyst component; and
   (b) controlling an amount of an organozinc compound introduced into the polymerization reactor system to produce the olefin polymer with the target HLMI/MI shear ratio and/or the target Mz/Mw ratio.

14. The process of claim 13, wherein the olefin polymer has:
   a melt index (MI) of less than about 10 g/10 min;
   a number-average molecular weight (Mn) in a range from about 5,000 to about 40,000 g/mol;
   a weight-average molecular weight (Mw) in a range from about 100,000 to about 350,000 g/mol; or
   a Mw/Mn ratio in a range from about 5 to about 40; or
   any combination thereof.

15. The process of claim 14, wherein the organozinc compound comprises diethylzinc, and the olefin polymer is an ethylene/α-olefin copolymer.

16. The process of claim 13, wherein the HLMI/MI shear ratio of the olefin polymer decreases as the amount of the organozinc compound added to the polymerization reactor system increases.

17. The process of claim 13, wherein the Mz/Mw ratio of the olefin polymer increases as the amount of the organozinc compound added to the polymerization reactor system increases.

18. The process of claim 13, wherein the olefin polymer comprises a higher molecular weight component and a lower molecular weight component, and wherein:
   a weight ratio of the higher molecular weight component to the lower molecular weight component decreases as the amount of the organozinc compound added to the polymerization reactor system increases;
   a peak molecular weight of the lower molecular weight component increases as the amount of the organozinc compound added to the polymerization reactor system increases; or
   a peak molecular weight of the higher molecular weight component is substantially unchanged as the amount of the organozinc compound added to the polymerization reactor system increases; or
   any combination thereof.

19. The process of claim 13, wherein:
   the polymerization reactor system comprises a loop slurry reactor;
   the organozinc compound comprises diethylzinc; and
   the olefin polymer is an ethylene/1-hexene copolymer.

20. The process of claim 19, wherein the dual catalyst system comprises:

a first metallocene catalyst component comprising an unbridged metallocene compound containing zirconium or an unbridged dinuclear metallocene compound containing zirconium;

a second metallocene catalyst component comprising a bridged metallocene compound containing zirconium or hafnium;

an activator-support comprising a solid oxide treated with an electron-withdrawing anion; and an organoaluminum compound.

* * * * *